(12) United States Patent  (10) Patent No.: US 8,594,514 B2
Rahn  (45) Date of Patent: Nov. 26, 2013

(54) PHASE-MODULATED TRANSMISSION CONTROL USING EMBEDDED CONTROL SYMBOLS

(75) Inventor: Jeffrey T. Rahn, Sunnyvale, CA (US)

(73) Assignee: Infinera Corporation, Sunnyvale, CA (US)

( * ) Notice: Subject to any disclaimer, the term of this patent is extended or adjusted under 35 U.S.C. 154(b) by 90 days.

(21) Appl. No.: 13/338,485

(22) Filed: Dec. 28, 2011

(65) Prior Publication Data

US 2013/0170831 A1 Jul. 4, 2013

(51) Int. Cl.
*H04B 10/04* (2011.01)

(52) U.S. Cl.
USPC .......................... 398/195; 398/188; 398/184

(58) Field of Classification Search
USPC .............. 398/9–38, 65, 152, 182–201, 150
See application file for complete search history.

(56) References Cited

U.S. PATENT DOCUMENTS

| | | | | |
|---|---|---|---|---|
| 6,009,317 A * | 12/1999 | Wynn | 455/296 |
| 6,044,112 A * | 3/2000 | Koslov | 375/235 |
| 6,188,732 B1 * | 2/2001 | Rha | 375/297 |
| 6,310,513 B1 * | 10/2001 | Iemura | 329/304 |
| 6,484,042 B1 * | 11/2002 | Loke | 455/550.1 |
| 6,765,623 B1 * | 7/2004 | Parker | 348/607 |
| 7,031,399 B2 * | 4/2006 | Iemura | 375/285 |
| 7,456,683 B2 * | 11/2008 | Takano et al. | 329/349 |
| 7,649,934 B2 * | 1/2010 | Su | 375/235 |
| 7,831,215 B2 * | 11/2010 | Park et al. | 455/88 |
| 8,345,801 B2 * | 1/2013 | Yoon | 375/324 |
| 8,391,724 B2 * | 3/2013 | Aruga et al. | 398/198 |
| 2005/0157819 A1 * | 7/2005 | Wang et al. | 375/322 |
| 2010/0272446 A1 * | 10/2010 | Harley et al. | 398/184 |
| 2011/0222853 A1 * | 9/2011 | Tanaka et al. | 398/65 |
| 2011/0229150 A1 * | 9/2011 | Nishihara et al. | 398/195 |
| 2011/0293276 A1 * | 12/2011 | Takahara | 398/65 |
| 2012/0301153 A1 * | 11/2012 | Takeguchi et al. | 398/135 |

* cited by examiner

*Primary Examiner* — Ken Vanderpuye
*Assistant Examiner* — Dibson Sanchez
(74) *Attorney, Agent, or Firm* — Harrity & Harrity LLP; David L. Soltz

(57) ABSTRACT

A system receives a phase-modulated signal that carries client symbols and a sequence that includes first symbols on which a first tone is to be based and having a first power level, and second symbols on which a second tone is to be based and having a second power level; processes the sequence to generate the first tone and the second tone; determines a power difference based on the first power level and the second power level; retrieves condition information that identifies a threshold for determining whether a condition is associated with the signal; determines whether the power difference is greater than the threshold; and outputs an instruction, to adjust a parameter, used to transmit the signal, based on the determination that the condition is associated with the signal, where adjusting the parameter causes the power difference to decrease to a level that is less than the threshold.

26 Claims, 12 Drawing Sheets

PHASE-MODULATED TRANSMISSION CONTROL USING EMBEDDED CONTROL SYMBOLS

BACKGROUND

In an increasingly networked world, more and more traffic, such as data, voice, and video, is transmitted over public and proprietary networks. The networks are using high data rates (e.g., greater than 10 gigabits per second (Gbps)) to transport greater quantities of traffic. Certain types of the networks, such as optical networks, are using complex signal processing to perform coherent processing and/or to implement and process phase modulated signal formats (e.g., instead of on-off keying (OOK)) to achieve the high data rates. A transmitted optical signal, that includes transmission parameters that do not vary outside of predetermined ranges (e.g., associated with wavelength, noise spectrum, power level, etc.) over time and/or that does not vary in a variety of operating conditions, may enable the network to use the coherent processing and/or phase modulation techniques to transmit the traffic. The optical signal may be generated using a stabilized laser and/or complex controls that do not allow transmission parameters to drift outside of the predetermined ranges, which may cause the cost, performance, and/or maintenance, associated with the network, to decrease.

SUMMARY

According to one implementation, a method may include receiving, with a node, a phase-modulated signal that carries client symbols and a control sequence, the node having a memory associated therewith, where the control sequence may include: first control symbols on which a first tone is to be based, the first tone having a first power level, and second control symbols on which a second tone is to be based, the second tone having a second power level; and processing a first portion of the signal to generate the first tone and a second portion of the signal to generate the second tone, where the first portion may include the first control symbols and where the second portion may include the second control symbols. The method may also include determining a power difference based on a difference between the first power level and the second power level; retrieving, from a memory, condition information, associated with the control sequence, that identifies a threshold for determining whether a condition, that corresponds to a particular type of condition, is associated with the signal based on the power difference; determining whether the power difference is greater than the threshold; determining that the condition is associated with the signal when the power difference is greater than the threshold; and outputting an instruction to adjust a parameter, used to transmit the signal, based on the determination that the condition is associated with the signal, where the instruction to adjust the parameter causes the power difference to decrease to a level that is less than the threshold.

According to another implementation, an optical transmission system may include one or more devices to detect a phase-modulated signal that includes client symbols and a control sequence, where the control sequence includes first control symbols that are based on first predetermined phase modulation states, and second control signals that are based on second predetermined phase modulation states; generate a first tone, having a first power level, in response to the first control symbols; generate a second tone, having a second power level, in response to the second control symbols; and identify a power difference between the first tone and the second tone based on the first power level and the second power level. The optical transmission system may also include the one or more processors to determine whether the power difference is greater than a threshold; output the signal, without adjusting a parameter, when the power difference is not greater than the threshold, where the parameter controls a manner in which the signal is generated or transmitted; adjust the parameter to cause the power difference to decrease to a level that is not greater than the threshold when the power difference is greater than the threshold; and output the signal based the adjusted parameter.

According to a further implementation, a network device may include a memory to store condition information that identifies a group of control sequences and a group of conditions to which the group of control sequences correspond, where each of the group of control sequences correspond to a respective one of the group of conditions. The network device may also include one or more detector components to detect a phase-modulated signal that includes client symbols and a control sequence, of the group of control sequences, the control sequence allowing a condition of the group of conditions, associated with the signal, to be identified; generate a first tone, associated with the signal and having a first power level, in response to first control symbols obtained from the control sequence; and generate a second tone, associated with the signal and having a second power level, in response to second control symbols obtained from the control sequence. The network device may further include one or more processors to; determine whether a power difference, between the first power level and the second power level, is greater than a threshold identified by the condition information associated with the control sequence; output the signal, without adjusting a parameter associated with the signal, when the power difference is not greater than the threshold, and output the signal, in a manner that includes adjusting the parameter, when the power difference is greater than the threshold, where adjusting the parameter causes the power difference to decrease to a level that is less than the threshold.

DETAILED DESCRIPTION

Figure 1:
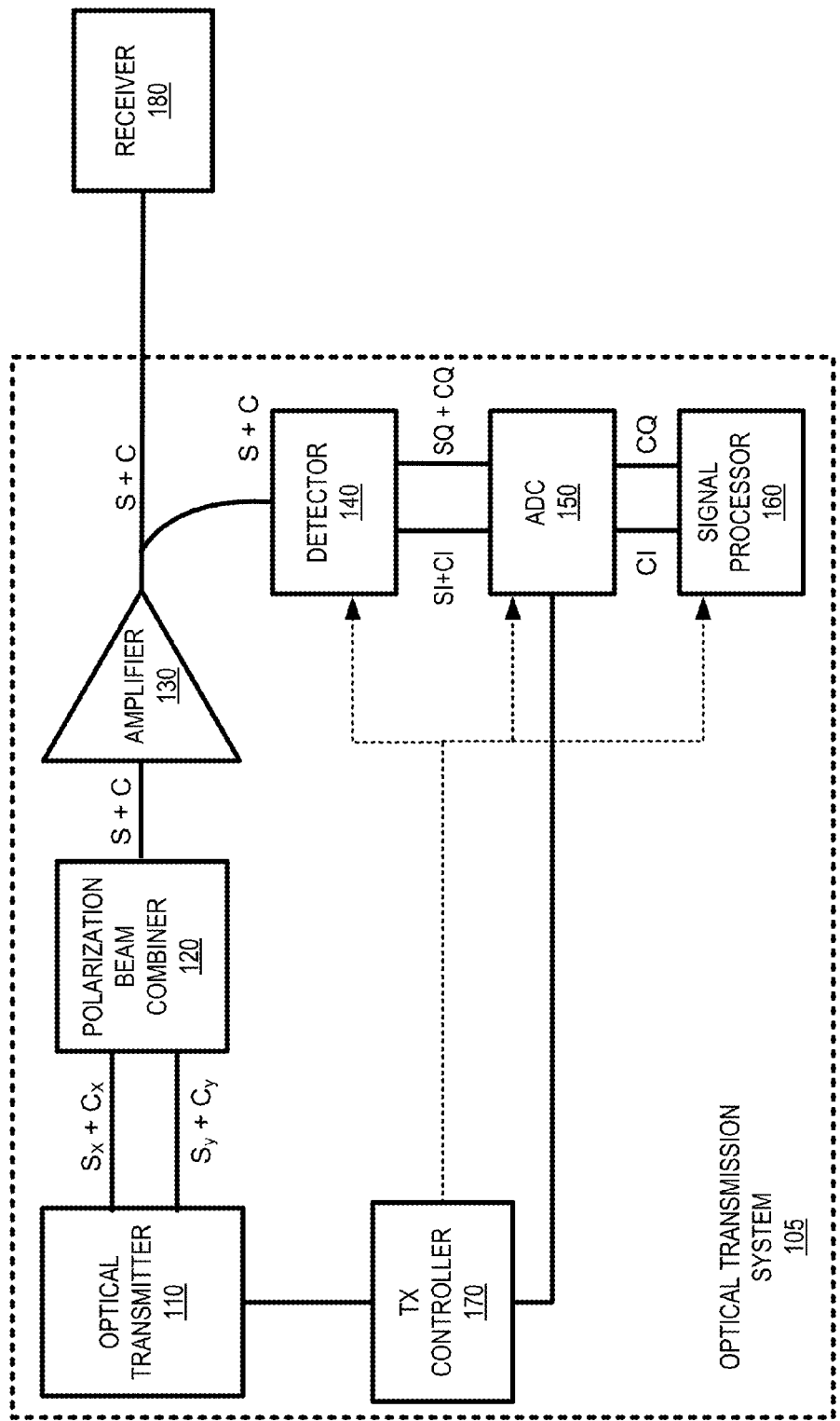
FIG. 1 is a block diagram of an example network in which systems and/or methods described herein may be implemented.

The following detailed description refers to the accompanying drawings. The same reference numbers in different drawings may identify the same or similar elements. Also, the following detailed description does not limit the implementations.

A system and/or method, in an example implementation described herein, may permit an optical transmitter system to generate an optical signal that includes one or more control sequences that permit control parameters, within the optical signal, to be identified. The system and/or method may allow the transmitter system to determine conditions, associated with the optical signal, based on the identified control parameters. The system and/or method may enable the transmitter system and/or some other network device or component to adjust one or more of the control parameters to remedy the condition.

The term control sequence, as used herein, may include a pair of sets of phase modulated symbols that are inserted, by the transmitter, between symbols associated with a client payload being transported via the signal. Each set of phase modulated symbols may include a sequence of symbols that correspond to one or more of possible states based on a type of phase modulation being used (e.g., for quadrature phase shift keying (QPSK), etc.). The states may, for example, be based on a real, in-phase component (e.g., I) and/or an imaginary, quadrature component (e.g., Q). Thus, in the QPSK example, a control sequence may be based on one or more of a first symbol (e.g., I+Q), a second symbol (e.g., I−Q), a third symbol (e.g., −I−Q), and/or a fourth symbol (e.g., −I+Q).

The transmitter may insert a first control sequence, that includes a first set of control symbols and a second set of control symbols, into an optical signal and may output the optical signal to an optical receiver via a link (e.g., a fiber optic cable, etc.). The transmitter may obtain a portion of the outputted optical signal and may process the outputted signal, using the first set of control symbols, to generate a first tone (e.g., where a tone may correspond to a signal associated with a particular frequency, periodicity, bandwidth, etc.). The transmitter may process the outputted signal, using the second set of control symbols, to generate a second tone. The transmitter may identify a difference in power level between the first tone and the second tone. The transmitter may identify whether a first condition is associated with the optical signal, such as a power imbalance between the I and Q components of the optical signal, based on the difference in power level. The transmitter may remedy the first condition by adjusting the power level in the I and/or Q components.

The transmitter may also, or alternatively, insert a second control sequence into the signal and may, in the manner described above, process the outputted signal to determine whether there is another condition associated with the optical signal, such as quadrature angle error. The transmitter may remedy the second condition by adjusting a quadrature angle, associated with the signal. The transmitter may insert other control sequences into the signal to identify and/or remedy other conditions, associated with the optical signal, such as a wavelocking condition (e.g., wavelength offset and/or frequency offset), time skew between I and Q components, etc.

By embedding a control sequence in the signal, no dedicated hardware is needed to generate the control sequences. By making the total duration of processing the control sequence relatively long (e.g., relative to a threshold), the detection of the state of the transmitter can be accomplished with a conventional photodiode and/or signal processing circuit. This can be accomplished after polarization and wavelength multiplexing of signals, provided the control sequences are time interleaved.

In the description below, certain operations are described as being performed on traffic that has been modulated using QPSK techniques. In another implementation, one or more of these operations may be performed using another type of phase modulation, such as binary phase shift keying (BPSK), higher-order phase shift keying (e.g., 8-PSK, etc.), etc. Thus, the examples below, that describe the operations being performed on traffic that has been modulated based on QPSK, are provided for explanatory purposes.

FIG. 1 is a block diagram of an example network 100 in which systems and/or methods described herein may be implemented. Network 100 may include an optical transmission system 105, an optical transmitter 110, a polarization beam combiner (PBC) 120, an amplifier 130, a detector 140, an analog-to-digital converter (ADC) 150, a signal processor 160, a transmitter (TX) controller 170, and a receiver 180. The quantity of devices, illustrated in FIG. 1, is provided for explanatory purposes. In practice, there may be additional devices, fewer devices, different devices, or differently arranged devices than illustrated in FIG. 1.

Also, in some implementations, one or more of the devices, of network 100, may perform one or more functions described as being performed by another one or more of the devices of network 100. For example, one or more of devices 110-170 could be combined into a single device or system, such as an optical transmission system (OTS) 105 (e.g., as shown by the dotted box in FIG. 1). In another example, optical transmitter 110, PBC 120 and/or amplifier 130 could be combined into a single device. In yet another example, detector 140, ADC 150, and/or signal processor 160 could be combined into a single device.

Optical transmitter 110 may include one or more devices that generate, process, and/or transmit an optical signal. Optical transmitter 110 may, for example, generate an optical signal for transmission to PBC 120. Optical transmitter 110 may also, or alternatively, modulate the optical signals (e.g., based on phase-modulation techniques) based on input electrical signals. The input electrical signals may include a client signal (e.g., S) received from a client and/or may include a control signal (e.g., C that includes one or more controls sequences) that allows transmission parameters, associated with the optical signal, to be analyzed. Optical transmitter 110 may also, or alternatively, multiplex the modulated optical signals (e.g., using wavelength-division multiplexing (WDM) techniques). Optical transmitter 110 may output, to PBC 120, the optical signal (e.g., as S+C). The optical signals may include a first optical signal, associated with a first polarization, such as a transverse electric (TE) polarization (hereinafter referred to as "X polarization") (e.g., $S_X + C_X$). The optical signals may also include a second optical signal, associated with a second polarization, such as a transverse magnetic (TM) polarization (hereinafter referred to as "Y polarization") (e.g., $S_Y + C_Y$).

PBC 120 may include one or more devices that receive optical signals and combine the received optical signals into an optical signal for output. In an example implementation, PBC 120 may receive, from optical transmitter 110, the first and second optical signals based on the first and second polarizations, respectively. PBC 120 may combine the first and second optical signals into an optical signal (e.g., S+C), with a dual polarization based on the first and second polarizations. PBC 120 may output, to amplifier 130, an optical signal with the dual polarization. In another example implementation, PBC 120 could be omitted if the modulation format were not polarization multiplexed.

Amplifier 130 may include a device capable of increasing an amplitude and/or power level of a received optical signal, while maintaining the wavelength, bandwidth, polarization, and/or phase characteristics, associated with the optical signal. Amplifier 130 may receive the optical signal from PBC 120, and may amplify the optical signal to an amplitude that is greater than a threshold. Amplifier 130 may output the amplified optical signal to optical receiver 180 and/or to detector 140.

Detector 140 may include one or more devices that can detect an optical signal and output an electrical signal based on the detected optical signal. Detector 140 may, for example, output a first electrical signal based on all or a portion of the wavelengths included within the detected optical signal. In an example implementation, detector 140 may include a photo detector that detects an optical signal and outputs the first electrical signal based on all or the portion of the wavelengths associated with the optical signal. Detector 140 may, in another example, output a second electrical signal based on a filtered version of the detected optical signal. In an example implementation, detector 140 may include an etalon device that includes a frequency response on which wavelengths, associated with channels used for transmitting optical signals, are based. The frequency response may, for example, enable detector 140 to act as a stable reference on which wavelengths, used by optical transmitter 110 to transmit optical signals, may be calibrated and/or tuned. Additionally, or alternatively, detector 140 may include a periodic etalon filter or a periodic unbalanced Mach-Zehnder interferometer instead of, or in combination with, the etalon device. The frequency response may be represented by a transfer function (e.g., based on wavelengths and respective quantities of attenuation or gain) that, when acting as the stable reference, does not change by an amount that is greater than a threshold (e.g., based on a percentage of change, etc.) over a period of time and/or does not change in varying conditions (e.g., associated with temperature, humidity, etc.). Detector 140 may output the second electrical signal based on the detected optical signal and the frequency response associated with the etalon device.

ADC 150 may include one or more devices that receive and/or process an electrical signal to convert the electrical signal to a digital electrical signal. ADC 150 may, in an example implementation, convert one or more electrical signals, received from detector 140, to a digital electrical signal for transmission to signal processor 160. A sampling rate, used by ADC 150 may, for example, be less than the symbol rate, based on a quantity of consecutive signals that are inserted into the control sequence.

Signal processor 160 may include one or more devices that process electrical signals to identify transmission parameters that correspond to the optical signal output by transmitter 110. Signal processor 160 may, for example, identify power levels and/or phase angles associated with the digital signals received from ADC 150. The power levels and/or phase angles may also, or alternatively, be identified for each real and/or imaginary components (e.g., I and/or Q, respectively) and/or each polarization component (e.g., X polarization and/or Y polarization). Signal processor 160 may also, or alternatively, process the digital signals to identify a quadrature angle associated with the imaginary component relative to the real component.

Signal processor 160 may also, or alternatively, use the power levels, associated with the signals to detect potential conditions associated with the optical signal, such as a wavelocking condition (e.g., wavelength offset and/or frequency offset) relative to a fixed channel wavelength, offset between a signal and a wavelength combining filter such as an array waveguide grating (AWG) device, power differences between I and Q components (sometimes referred to as "I/Q gain"), power differences between polarization components (e.g., sometimes referred to as "polarization gain"), time skew between I and Q components (sometimes referred to as "I/Q delay"), quadrature angle error, etc. Signal processor 160 may output a signal to TX controller 170, via ADC 150, to identify the condition.

Additionally, or alternatively, signal processor 160 may also, or alternatively, be associated with a transmitter (e.g., optical transmitter 110) to generate amplitude modulated data streams. In this example, detection of power levels, chirp, wavelength, and optical modulation amplitude could be performed.

TX controller 170 may include one or more devices that provide timing and control signals, to one or more devices within network 100, that allows conditions, associated with an optical signal, to be remedied or mitigated. In an example implementation, TX controller 170 may be remote from one or more of devices 110-160, which may allow optical signals, generated by optical transmitter 110, to be monitored and/or controlled, by TX controller 170 and/or an operator of TX controller 170, from a different geographical area than devices 110-160. In this example, TX controller 170 may provide an indication of conditions and/or impairments suffered during transmission, such as, for example, chromatic dispersion, polarization mode dispersion, polarization dependent loss, wavelength dependent loss, optical noise accumulation, cross-phase modulation or self-phase modulation.

TX controller 170 may, for example, generate one or more control sequences (e.g., based on one or more predetermined sets of phase modulated symbols) and may transmit the control sequences, to optical transmitter 110, to allow the control sequences to be inserted, into the optical signal, by optical transmitter 110. TX controller 170 may output timing signals (e.g., as shown by the dotted arrows in FIG. 1), to optical transmitter 110, detector 140, ADC 150, signal processor 160, and/or another device, that identify to a time at which the control sequences are generated, outputted to optical transmitter 110, and/or inserted, by optical transmitter 110, into the optical signal. The timing signal may allow the devices to synchronize processing of the control sequences based on the time and/or a position, within the optical signal, where the control sequences are located.

TX controller 170 may also, or alternatively, receive a control signal from signal processor 160 via ADC 150 that identifies a condition associated with the optical signal. TX controller 170 may, based on the control signal, transmit an instruction to optical transmitter 110 to adjust one or more transmission parameters, associated with the optical signal, that cause the condition to be remedied. TX controller 170 may, for example, instruct optical transmitter 110 to increase or decrease a wavelength, used to transmit the optical signal, to remedy a wavelocking condition. TX controller 170 may also, or alternatively, instruct optical transmitter 110 to increase or decrease the alignment of a wavelength dependent filter, such as an AWG, to optimize multiplexing of signals associated with different wavelengths. TX controller 170 may also, or alternatively, instruct optical transmitter 110 to increase or decrease a power level, associated with one or more components of the optical signal, to remedy conditions associated with I/Q gain imbalance, polarization gain imbalance, etc. TX controller 170 may also, or alternatively, instruct optical transmitter 110 to increase or decrease a quadrature angle (e.g., associated with one or more phase modulation states) to remedy a condition associated with quadrature error, I/Q delay, etc.

Receiver 180 may include one or more devices that can receive and/or process an optical signal, and/or transmit, to a client device (not shown in FIG. 1), a signal based on the processed optical signal. In an example implementation, receiver 180 may be a coherent optical receiver. Receiver 180 may receive, from amplifier 130, the optical signal, may demultiplex the optical signal (e.g., using one or more demultiplexors and using wave-division demultiplexing techniques) to create one or more different optical signals. Receiver 180 may also, or alternatively, demodulate the optical signals (e.g., using one or more demodulators that can process phase-modulated signals) and/or may remove symbols associated with control sequences, that were inserted into the optical signal by optical transmitter 110, to recover one or more client signals (e.g., as electrical signals). Receiver 180 may transmit the one or more client signals to client devices.

Figure 2:
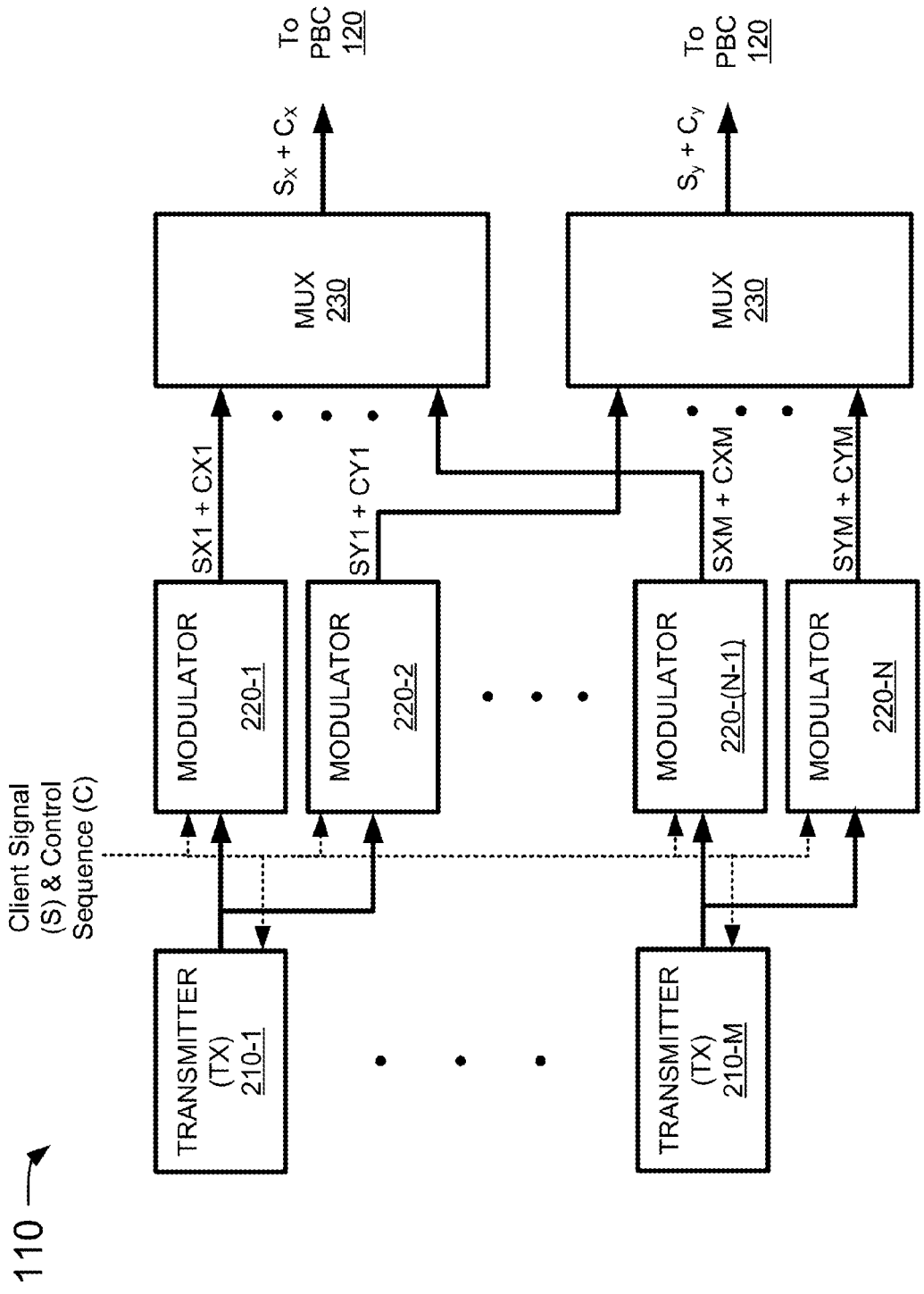
FIG. 2 is a diagram of example components of a transmitter of FIG. 1.

FIG. 2 is a diagram of example components of optical transmitter 110. Optical transmitter 110 may include a collection of components, such as a group of transmitters 210-1, ..., 210-M (where M≥1) (hereinafter referred to collectively as "transmitters 210" and individually as "transmitter 210"), a group of modulators 220-1, ..., 220-N (where N≥1) (hereinafter referred to collectively as "modulators 220" and individually as "modulator 220"), and a pair of multiplexers (MUXs) 230. The quantity of components, shown in FIG. 2, is provided for explanatory purposes. In practice, there may be additional components, fewer components, different components, or differently arranged components than shown in FIG. 2.

Transmitter 210 may include one or more components that are capable of generating an optical signal that can be outputted to modulator 220 (e.g., via an optical fiber). In one implementation, transmitter 210 may be a laser that generates and/or transmits an optical signal at a particular wavelength and/or with a particular bandwidth, which may be tuned and/or calibrated based on an instruction received, via a control signal (e.g., shown as a dotted line in FIG. 1), from TX controller 170 and/or by an operator of optical transmitter 110. Transmitter 210 may be tuned, by increasing or decreasing a transmission wavelength, to enable a condition, associated with the optical signal, to be remedied or mitigated.

Modulator 220 may include one or more components that are capable of modulating an optical signal received from transmitter 210. For example, modulator 220 may receive an optical signal from transmitter 210 and may modulate a first component of the optical signal, associated with a first polarization (e.g., the X polarization), using an electrical signal or radio frequency (RF) signal received from a client device and/or TX controller 170 (e.g., shown as the dotted line in FIG. 2). Modulator 220 may modulate the first component of the optical signal, based on the client signal, to create a modulated optical signal (e.g., SX) associated with the first polarization. Modulator 220 may modulate the optical signal using phase modulation techniques (e.g., based on QPSK and/or another phase modulation technique) so that the modulated optical signal includes a collection of phase-modulated symbols.

Modulator 220 may also, or alternatively, use the control signal to modulate the optical signal to create sets of known symbols associated with control sequences. Modulator 220 may cause symbols, associated with a control sequence, to be inserted between adjacent symbols associated with the client symbols. The quantity of symbols, associated with the control sequence, may be small compared to a quantity of symbols associated with the client symbols (e.g., based on a ratio of one control symbol for every one-thousand client symbols or some other ratio). Modulator 220 may output the modulated first component of the optical signal (e.g., as SX+CX) to a first MUX 230. Another modulator 220 may, in the manner described above, modulate a second component of the optical signal associated with the second polarization (e.g., the Y polarization) and may output the modulated second component of the optical signal (e.g., as SY+CY) to a second MUX 230.

Modulator 220 may also, or alternatively, increase or decrease a quadrature angle, associated with a real and/or imaginary component of the optical signal, based on an instruction received from TX controller 170. Modulator 220 may, in one example, adjust a phase angle associated with one or more phase modulation states, such as one or more of the four states associated with QPSK techniques (e.g., I+Q, I–Q, –I–Q, –I+Q), to remedy a condition (e.g., associated quadrature error, I/Q delay, etc.)

MUX 230 may include one or more components to multiplex optical signals received from one or more modulators 220. For example, MUX 230 may multiplex one or more modulated first components (e.g., associated with the X polarization) of optical signals received from modulators 220 (e.g., using WDM techniques) into a single optical signal associated with multiple wavelengths. Each of the modulated first components may be correspond to a respective one of the wavelengths. MUX 230 may output the optical signal to PBC 120. Additionally, or alternatively, another MUX 230 may, as described above, multiplex one or more modulated second components (e.g., associated with the Y polarization) of optical signals received from other modulators 220 and may output another single optical signal to PBC 120.

Figure 3:
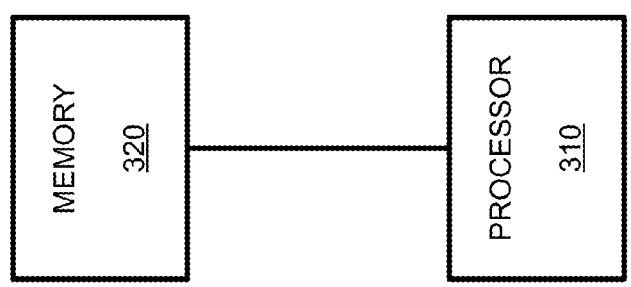
FIG. 3 is a diagram of example components of one or more devices of FIG. 1.

FIG. 3 is a diagram of example components of a device 300 that may correspond to signal processor 160 and/or TX controller 170. Alternatively, each of signal processor 160 and/or TX controller 170 may include one or more devices 300 and/or one or more components of device 300. Device 300 may include a processor 310 and a memory 320. In another implementation, device 300 may include additional components, fewer components, different components, or differently arranged components than are shown in FIG. 3.

Processor 310 may include a processor, microprocessor, or processing logic that may interpret and execute instructions. Memory 320 may include any type of dynamic storage device that may store information and instructions for execution by processor 310, and/or any type of non-volatile storage device that may store information for use by processor 310.

As will be described in detail below, device 300 may perform certain operations relating identifying and/or remedying conditions associated with an optical signal. Device 300 may perform these operations in response to processor 310 executing software instructions contained in a computer-readable medium, such as memory 320. A computer-readable medium may be defined as a non-transitory memory device. A memory device may include space within a single physical memory device or spread across multiple physical memory devices. The software instructions may be read into memory 320 from another computer-readable medium or from another device. The software instructions contained in memory 320 may cause processor 310 to perform processes described herein. Alternatively, hardwired circuitry may be used in place of or in combination with software instructions to implement processes described herein. Thus, implementations described herein are not limited to any specific combination of hardware circuitry and software.

Figure 4A:
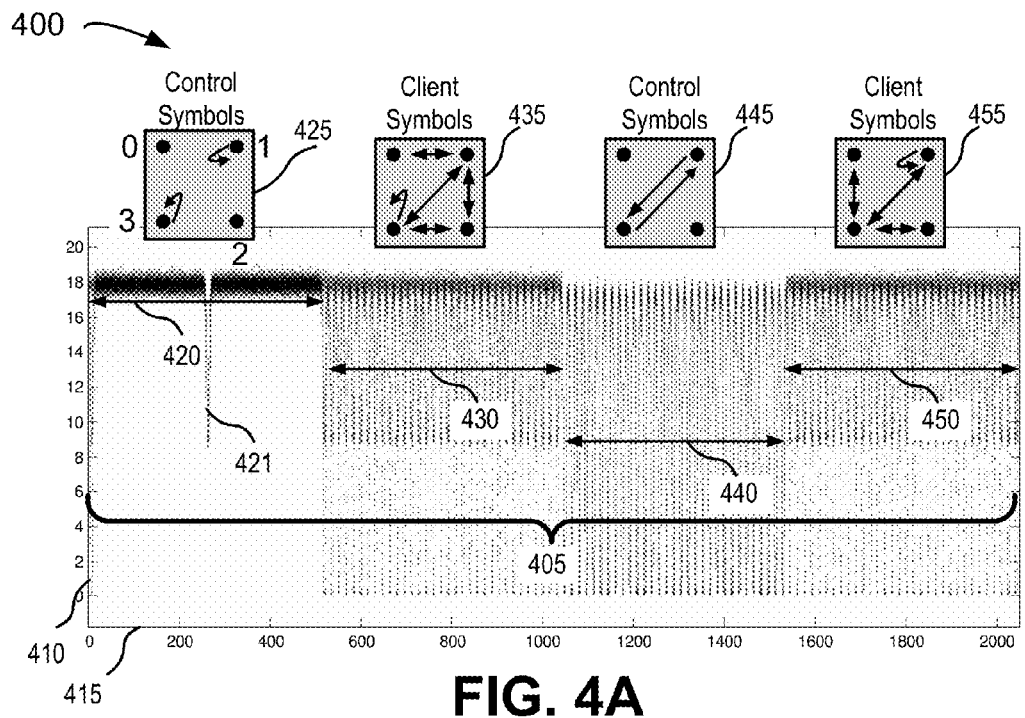
FIGS. 4A and 4B are diagrams of example signal power associated with an optical signal that includes control symbols and client symbols.
Figure 4B:
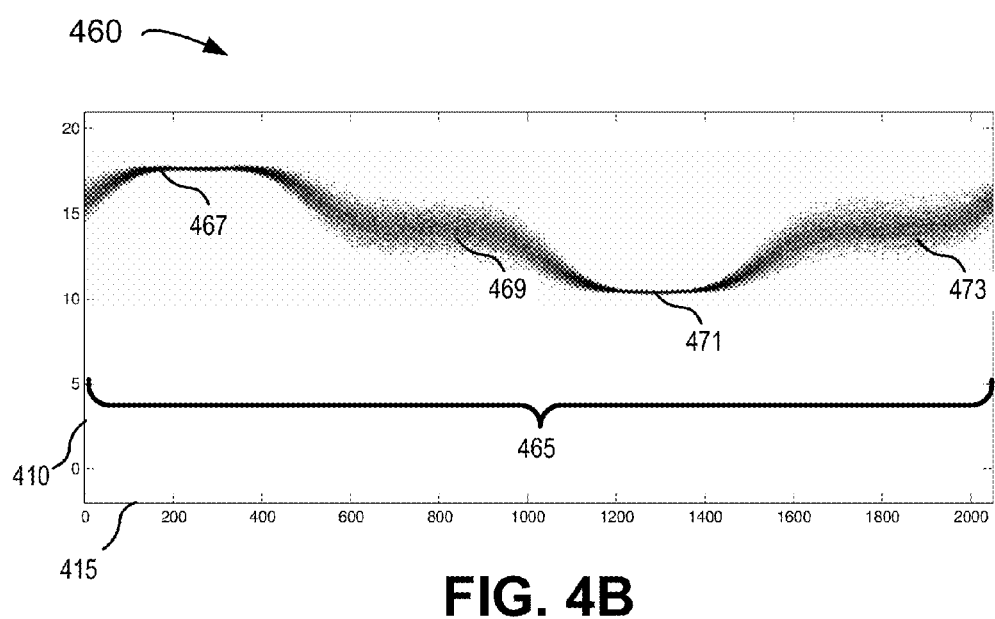

FIGS. 4A and 4B are diagrams of example signal power associated with an optical signal that includes control symbols and client symbols. As shown in FIG. 4A, a signal power response 400 may include signal power 405 as a function of signal amplitude, identified by amplitude scale 410 on the vertical axis, versus time as identified by time scale 415 on the horizontal axis. Signal power 405 may represent a quantity of signal power that is outputted by detector 140 as a result of receiving an optical signal from amplifier 130. The quantity of signal power may be identified within a range of amplitude identified by amplitude scale 410 (e.g., between 0 and 20 microvolts, millivolts, etc.) and a period of time identified by time scale 415 (e.g., between 0 and 2000 microseconds, milliseconds, etc.). In another example, response 400 may include signal power 405 as a function of signal amplitude versus a quantity of symbols as identified by a symbol scale (e.g., as the horizontal axis) instead of, or in addition to time scale 415. The symbol scale may identify a range of a quantity of symbols (e.g., QPSK symbols).

Signal power 405 may include signal power segments 420, . . . , 450. Signal power segment 420 may represent a quantity of signal power (e.g., corresponding to ~18 on amplitude scale 410), output by detector 140, when an optical signal includes a first control sequence. The first control sequence may include a known sequence of control symbols that are represented by constellation 425. Constellation 425 may include the four modulation states associated with QPSK phase modulation. A first constellation point (e.g., 0) may represent a first modulation state (e.g., I+Q); a second constellation point (e.g., 1) may represent a second modulation state (e.g., I−Q); a third constellation point (e.g., 2) may represent a third modulation state (e.g., −I−Q); and a fourth constellation point (e.g., 3) may represent a fourth modulation state (e.g., −I+Q).

Thus, constellation 425 may indicate that the first control sequence includes first consecutive control symbols (e.g., −I+Q, −I+Q, −I+Q, . . . ) associated with, for example, the fourth modulation state. Constellation 425 may represent the first consecutive control symbols as consecutive fourth constellation points (e.g., 3, 3, 3, 3, . . . as shown by the arrow that originates and terminates at the fourth constellation point). Constellation 425 may also may indicate that the first control sequence includes second consecutive control symbols (e.g., I−Q, I−Q, I−Q, . . . ) associated with, for example, the second modulation state and/or consecutive second constellation points (e.g., 1, 1, 1, 1, . . . , as shown by the arrow that originates and terminates at the second constellation point).

The first consecutive control symbols may cause approximately constant amplitude associated with power segment 420. Additionally, or alternatively, first consecutive control symbols do not change modulation state, which may cause the amplitude, associated with power segment 420, to reach a maximum relative to amplitudes associated with other power segments 430-450. However, when detector 140 processes the second consecutive control symbols, the modulation state may shift from the fourth to the second modulation state, which may cause a temporary decrease in amplitude (e.g., as identified by reference 421). The amplitude, associated with power segment 420, may return to the maximum amplitude when the second consecutive control symbols do not change modulation state.

Signal power segment 430 may represent a quantity of signal power, output by detector 140, when an optical signal includes first client symbols. First client symbols may represent client payload data that includes consecutive symbols that change modulation state and other consecutive symbols that do not change modulation state. For example, the horizontal, vertical, and/or diagonal arrows, within constellation 435 may represent consecutive symbols that change modulation state, which may cause the amplitude of signal power segment 430 to temporarily decrease with each change in modulation state. The curved arrows, within constellation 435 and as described above, may represent consecutive symbols that do not change modulation state, which may cause the amplitude of signal power segment 430 to temporarily reach a maximum amplitude. The consecutive client symbols that change modulation state and that do not change modulation state may cause a power level (e.g., an average power level, a mean power level, etc.), associated with power segment 430, to decrease to a level (e.g., 13 on amplitude scale 410) that is less than a power level associated with power segment 420 (e.g., ~18 on amplitude scale 410).

Signal power segment 440 may represent a quantity of signal power, output by detector 140, when the optical signal includes a second control sequence. Second control symbols may include consecutive control symbols that always change modulation state as shown by constellation 445 that does not include any curved arrows. The control symbols that always change modulation state may cause the power level, associated with signal power segment 440 to decrease each time the modulation state changes, which may cause a power level, associated with power segment 440 to decrease to a level (e.g., ~9 on amplitude scale 410) that is less than the power level associated with power segments 420 and 430.

Signal power segment 450 may represent a quantity of signal power, output by detector 140, when an optical signal includes second client symbols. In a manner similar to that described above, the consecutive client symbols may change modulation state and may remain in a same modulation state (e.g., as shown in constellation 455), which may cause the power, associated with power segment 450 to be approximately equal to the power level associated with power segment 430.

As shown in FIG. 4B, a filtered response 460 may include signal power 465 as a function of signal amplitude, identified by amplitude scale 410, versus time as identified by time scale 415. Signal power 465 may be a filtered (or slowed-down) version of response 400 (FIG. 4A) that is outputted from detector 140. Signal power 465 may include power segments 467, . . . , 473. Power segment 467 may correspond to power segment 420 of FIG. 4A. For example, a power level associated with power segment 467 may correspond to the power level associated with power segment 420. Power segment 469 may correspond to power segment 430 of FIG. 4A. For example, a power level associated with power segment 469 may correspond to the power level associated with power segment 430. Power segment 471 may correspond to power segment 430 of FIG. 4A. For example, a power level associated with power segment 471 may correspond to the power level associated with power segment 440. Power segment 473 may correspond to power segment 450 of FIG. 4A. For example, a power level associated with power segment 473 may correspond to the power level associated with power segment 450.

Signal power 465 may represent a well-behaved periodic signal, or tone, that can represent a signature of signal power 465. The signature may allow an amplitude modulation of the optical signal, caused by different known control sequences, to be unambiguously identified, which may allow power levels, between power segments associated with the optical signal, to be determined. Determination of the differences in power levels may allow a condition, associated with the optical signal to be determined. This example illustrates a tradeoff between inserted control word length (which includes an increase in the data rate and corresponding reduction in performance) and processing speed associated with a detection circuit (e.g., of detector 140) and/or ADC 150. The tradeoff can be made to optimize control speed, signal to noise ratio, and/or system performance.

Figure 5A:
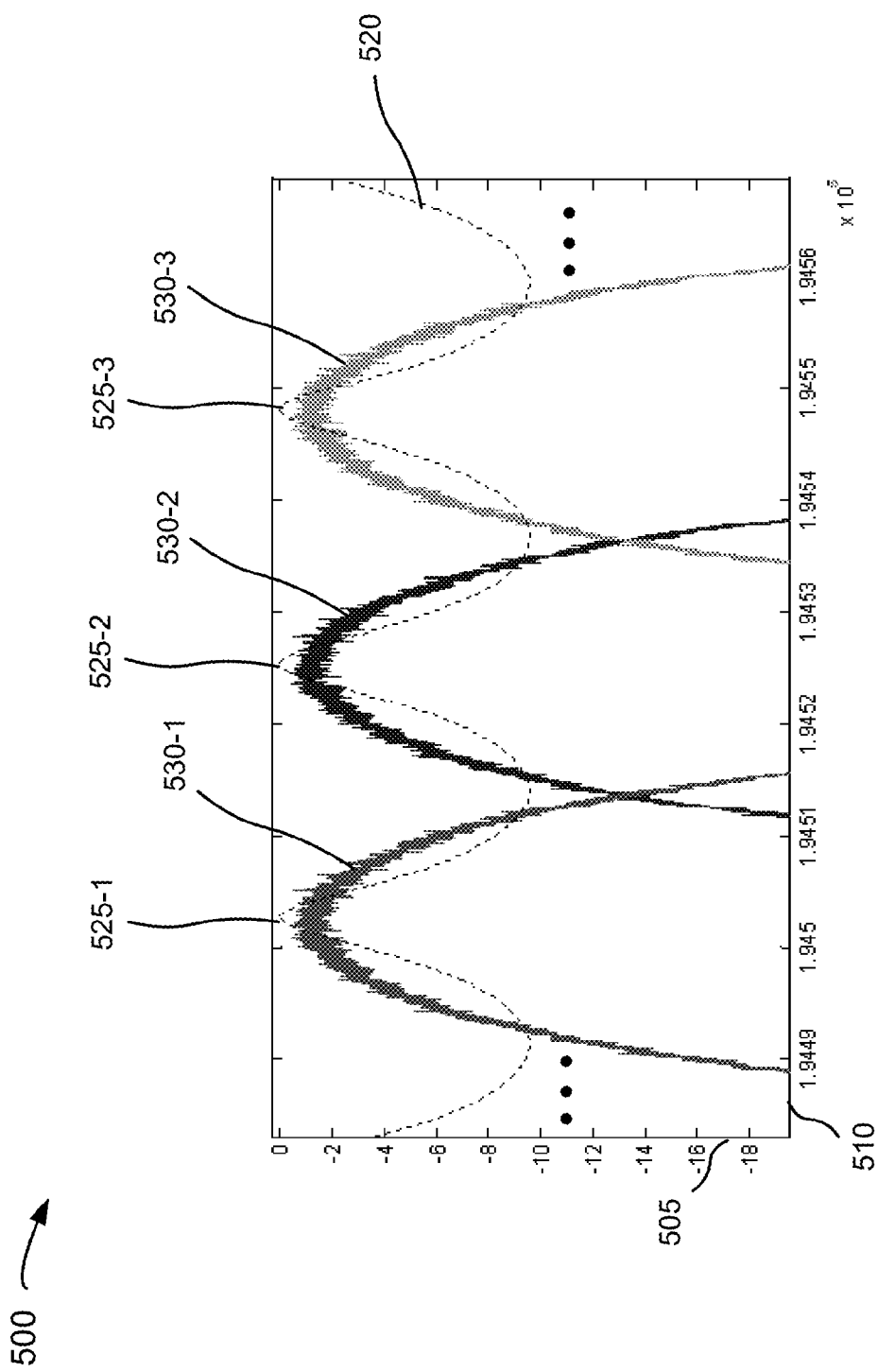
FIG. 5A is a diagram of an example transfer function associated with a detector of FIG. 1.

FIG. 5A is a diagram of an example response 500 associated with detector 140. As shown in FIG. 5A, response 500 may include a signal power scale 505 (e.g., as a vertical axis) and a frequency scale 510 (e.g., as a horizontal axis). Response 500 may illustrate a frequency response 520 that identifies a quantity of attenuation of an optical signal (e.g., half power (−3 dB) or some other quantity of attenuation), as a function of frequency, when the optical signal is received by detector 140. In an example implementation, response 500 may be associated with a fixed-wavelength device, such as an etalon, used by detector 140.

Frequency response 520 may include wavelength bands centered at peak transmission frequencies 525-1, . . . , 525-3 where attenuation is less than a threshold (e.g., less than −1 dB or some other threshold). Peak transmission frequency 525 may represent reference wavelengths that are stable over a time period and/or in a variety of conditions, and/or that represent center wavelengths on which transmission wavelengths and/or channels, used by optical transmitter 110 to transmit optical signals, are based.

Response 500 may include one or more optical signal spectra 530-1, . . . , 530-3, etc., associated with optical signals received by detector 140. Each optical signal spectra 530 are shown, in FIG. 6A, at different optical frequencies, identified as peak transmission frequencies 525-1 through 525-3. Optical signal spectra 530 may correspond to optical signals that were multiplexed at distinct wavelengths, by optical transmitter 110, into a single optical signal. The distinct wavelengths may be tuned to correspond to peak transmission points 525 to avoid cross talk between channels, to allow the signals to be processed, and/or to reduce a quantity of attenuation of the optical signals.

Figure 5B:
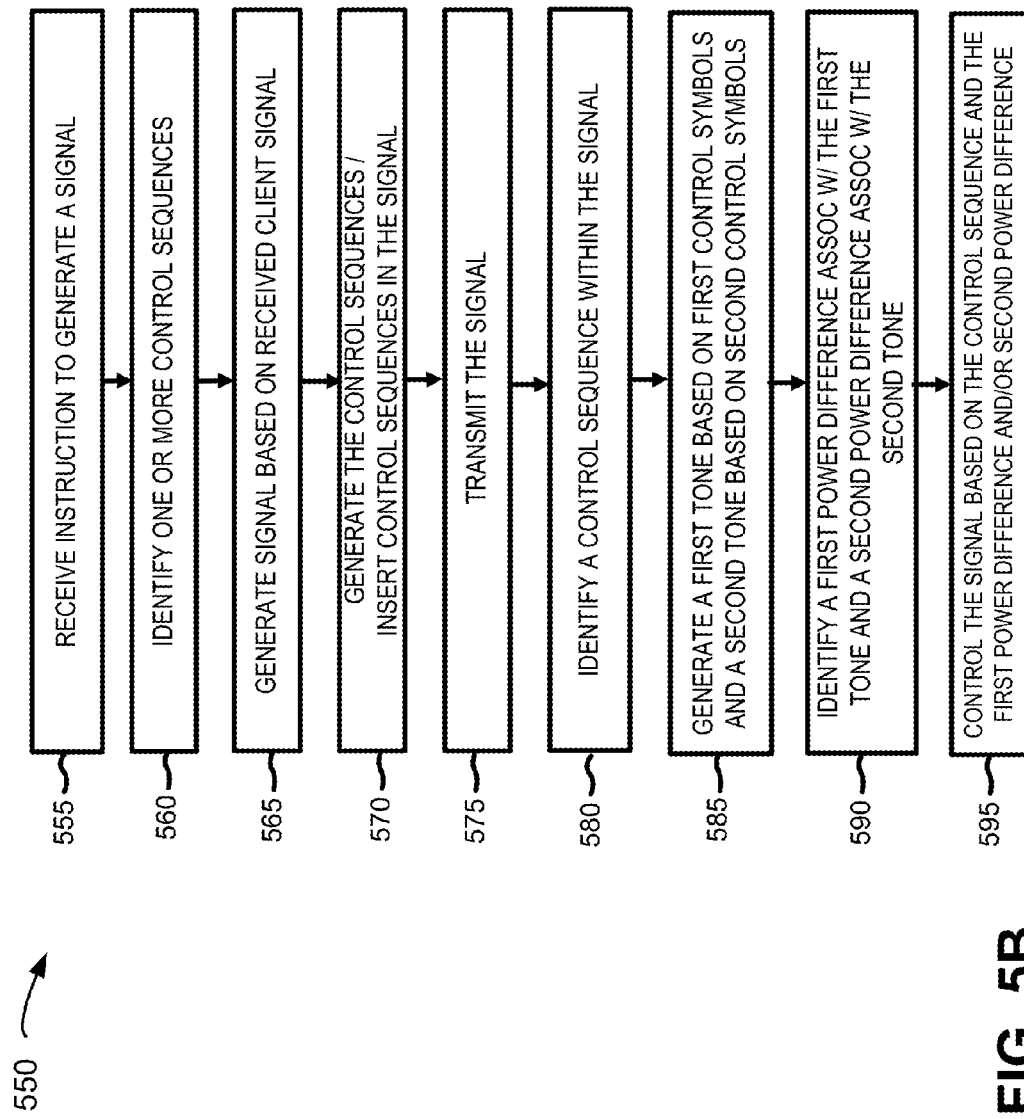
FIG. 5B is a flow chart of an example process to determine tone strength associated with an optical signal that includes a control sequence.

FIG. 5B is a flow chart of an example process 550 to determine tone strength associated with an optical signal that includes a control sequence. In one example implementation, process 550 may be performed by OTS 105. In another example implementation, some or all of process 500 may be performed by a device or collection of devices separate from, or in combination with, OTS 105.

As shown in FIG. 5B, process 550 may include receiving an instruction to generate an optical signal (block 555) and identifying one or more control sequences (block 560). For example, OTS 105 may receive an instruction to generate an optical signal. The instruction may be received from an operator of OTS 105. In another example, the instruction may be triggered when a client signal is received from a client device. OTS 105 may, as a result of receiving the instruction, identify one or more control sequences that are to be used to control transmission parameters associated with the optical signal. For example, OTS 105 may retrieve, from a memory associated with OTS 105, information associated with the control sequences that identifies a respective first set of control symbols and/or a respective second set of control symbols associated with each control sequence. The information, associated with the control sequences may also, or alternatively, identify phase modulation states associated with the control symbols within each control sequence. Each control sequence may correspond to a different transmission parameter that is to monitored and/or controlled by OTS 105.

Process 550 may also include generating the signal based on a received client signal (block 565), generating the control sequences and inserting the control sequences into the signal (block 570), and transmitting the signal (block 575). For example, OTS 105 may generate an optical signal associated with a first wavelength and may modulate the optical signal based on the client signal. OTS 105 may, for example, modulate the optical signal using phase modulation techniques (e.g., based on QPSK and/or some other phase modulation technique) to generate a collection of phase modulated symbols included within the optical signal.

OTS 105 may also, or alternatively, use the phase modulation techniques to generate a first set of control symbols and a second set of control symbols, associated with the first control sequence, based on the information associated with the control sequences. OTS 105 may insert the first set of control symbols and the second set of control symbols into the optical signal (e.g., between adjacent client symbols) at a second wavelength that is greater than the first wavelength by a threshold. In an example implementation, the first set of control symbols may be inserted between first adjacent client symbols and the second set of control symbols may be inserted between second adjacent client symbols that are different than the first adjacent client symbols. In another example implementation, the first set of control symbols and the second set of control symbols may be contiguous and may be inserted between adjacent client symbols.

In a manner similar to that described above, OTS 105 may also, or alternatively, insert the first set of control symbols and the second set of control symbols into the optical signal (e.g., between other adjacent client symbols) at a third wavelength that is less than the first wavelength by another threshold.

OTS 105 may, in a manner similar to that described above with respect to blocks 555-575, identify other control sequences, from the information associated with the control sequences, and may generate control symbols associated with the other control sequences in a manner similar to that described above. OTS 105 may insert the other control sequences into the optical signals at the second and/or third wavelengths, and/or at wavelengths that are different than the second and/or third wavelengths. OTS 105 may, in one example, continuously generate and/or insert the control sequences during a period of time when the client signal is received and/or processed by OTS 105. In another example, OTS 105 may generate and/or insert the other control sequences based on an interval of time (e.g., every 30 seconds, one minute, five minutes, etc.).

OTS 105 may transmit the optical signal, that includes the client symbols and/or the controls symbols associated with the control sequences, to an optical receiver to be processed and/or forwarded to a client device. OTS 105 may, in another example, multiplex the optical signal with another optical signal that was generated, by OTS 105, based on another client signal. OTS 105 may transmit the multiplexed optical signal to the optical receiver.

Process 550 may further include identifying a control sequence within the signal (block 580) and generating a first tone based on first control symbols and a second tone based on second control symbols (block 585). For example, OTS 105 may use detector 140 to detect a portion of the transmitted optical signal associated with the first and/or second wavelengths. OTS 105 may use detector 140 to filter the portion of the optical signal in a manner similar to that described above with respect to FIG. 4B. OTS 105 may, based on the filtered portion of the optical signal, obtain a first tone associated with the first control sequence and the client symbols.

OTS 105 may use detector 140 to detect another portion of the transmitted optical signal associated with the first and/or third wavelengths. OTS 105 may use detector 140 to filter the other portion of the optical signal in a manner similar to that described above with respect to FIG. 4B. OTS 105 may, based on the filtered other portion of the optical signal, obtain a second tone associated with the first control sequence and the other client symbols.

Process 550 may still further include identifying a power difference between the first tone and the second tone (block 590) and controlling the signal based on the control sequence and the identified power difference (block 595). For example, OTS 105 may identify a first power level associated with the first tone and a second power level associated with the second tone (e.g., based on an average power level, a mean power level, a cumulative power level, etc.). OTS 105 may identify a difference in power level between the first tone and the second tone based on a difference between the first power level and the second power level. OTS 105 may use the difference in power level to identify whether a condition, to which the first control sequence corresponds, is associated with the optical signal. OTS 105 may perform an operation to adjust one or more transmission parameters (e.g., wavelength, frequency, quadrature angle, power level, phase, etc.), to remedy the condition, based on the difference in power level. The identification of different types of conditions and/or performing operations to remedy the different types of conditions will be described in detail below with respect to FIGS. 6-11B.

Figure 6:
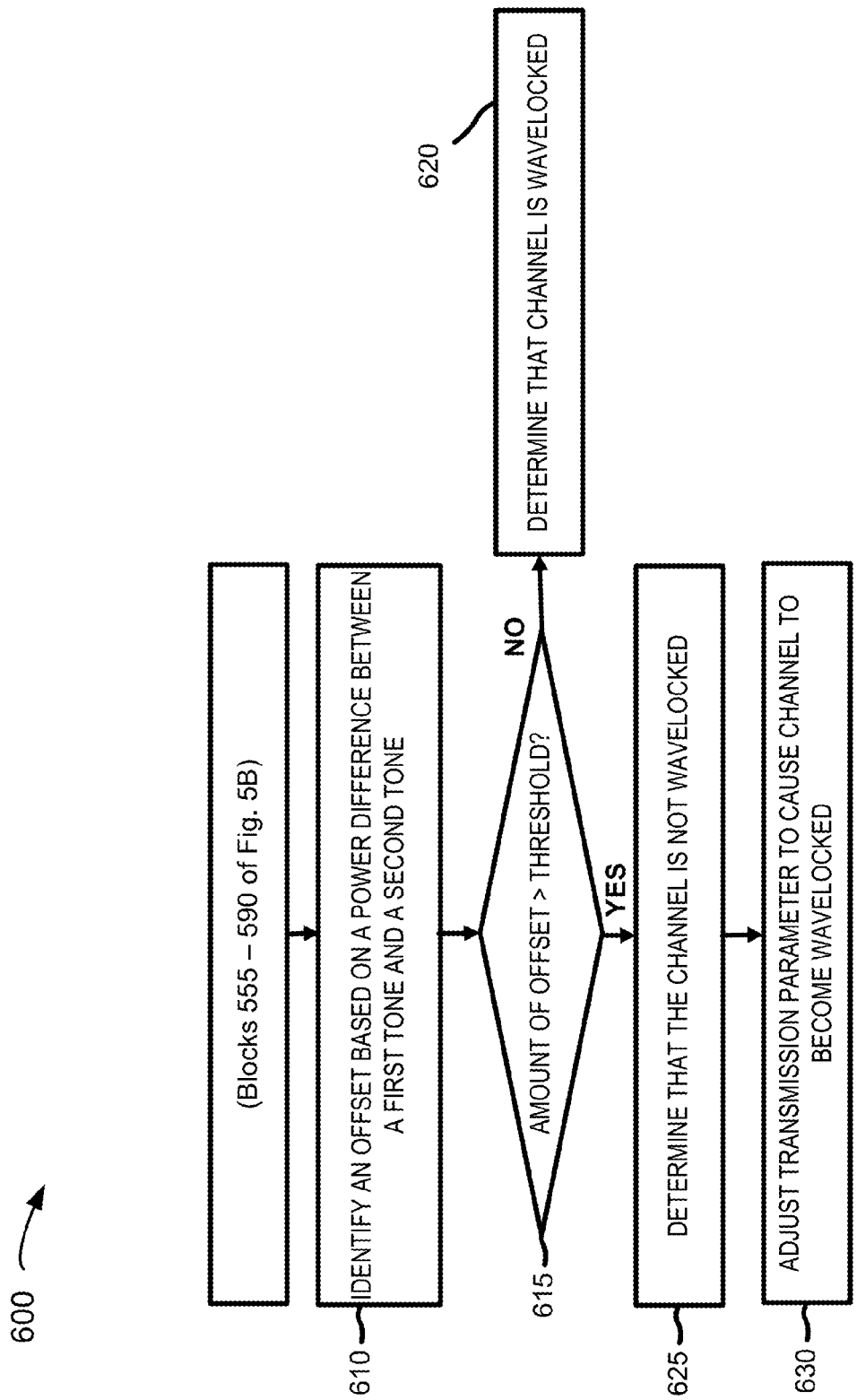
FIG. 6 is a flow chart of an example process for determining offset in an optical signal based on a control sequence.
Figures 7A, 7B:
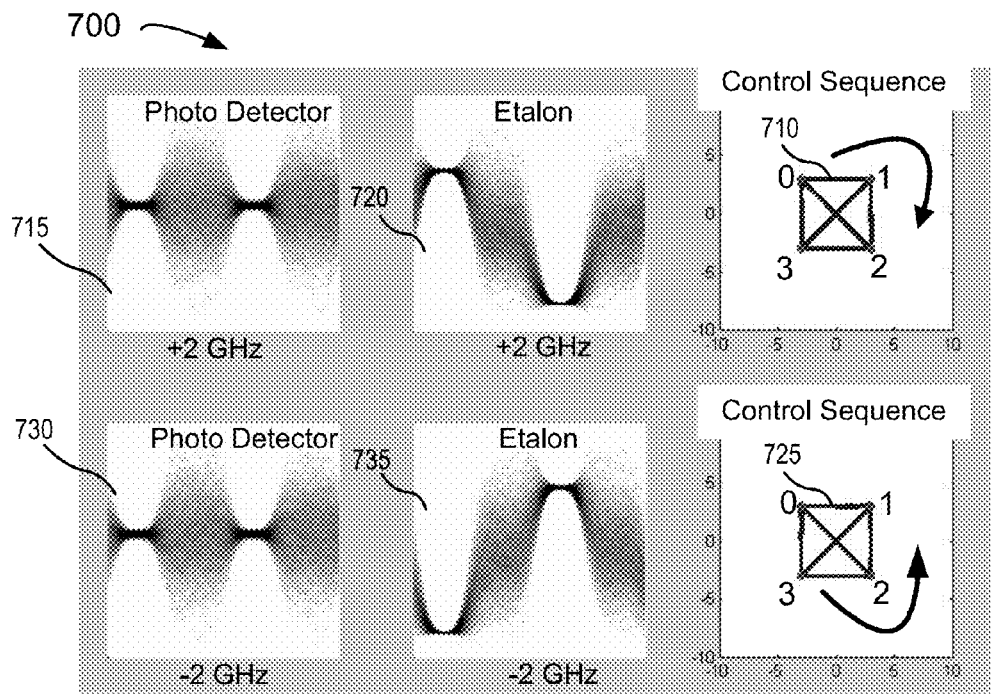
FIGS. 7A and 7B are diagrams of example power responses, based on a control sequence, used to identify a wavelocking condition associated with an optical signal.

FIG. 6 is a flow chart of an example process 600 for determining offset in an optical signal based on a control sequence. Process 600 may correspond to block 595 of FIG. 5B. In one example implementation, process 600 may be performed by OTS 105. In another example implementation, some or all of process 600 may be performed by a device or collection of devices separate from, or in combination with, OTS 105. FIGS. 7A and 7B are diagrams of filtered response 700 and wavelocking tone strength 750, respectively, based on a control sequence, used to identify a wavelocking condition associated with an optical signal. All or a portion of process 600, of FIG. 6, will be described with references to filtered response 700 of FIG. 7A and wavelocking tone strength 750 of FIG. 7B.

Assume that OTS 105 has generated and outputted an optical signal that includes a first control sequence that has been inserted into client symbols in a manner similar to that described above with respect to blocks 555-575 of FIG. 5B. Assume further that OTS 105 detects a portion of the outputted signal that includes a first control sequence and processes the portion of the optical signal, using the first control sequence to generate a first tone and a second tone in a manner similar to that described above with respect to blocks 580 and 585 of FIG. 5B. In one example, OTS 105 may determine that the first control sequence may correspond to a type of control sequence that can be used to identify and/or control a wavelocking condition, within the optical signal, associated with wavelength or frequency offset. Assume still further that OTS 105 identifies a power difference between the first tone and the second tone based on a first power level associated with the first tone and a second power level associated with the second tone in a manner similar to that described above with respect to block 590 of FIG. 5B.

For example, as shown in FIG. 7A, filtered response 700 may include a constellation 710 that identifies first control symbols, associated with the first control sequence, on which the first tone is based. Constellation 710 may identify a first control symbol associated with the first phase modulation state (e.g., 0), a second control symbol associated with the second modulation state (e.g., 1), a third control symbol associated with the third phase modulation state (e.g., 2), and a fourth control symbol associated with the fourth modulation state (e.g., 3). Thus, the first control symbols may include control symbols that correspond to a clockwise direction around a constellation 710 (e.g., 0, 1, 2, 3, . . . 0, 1, 2, 3, . . . ).

Filtered response 700 may include tone 715 and tone 720 that correspond to the first tone that is output by detector 140. Tone 715 may, for example, represent the first tone that is output by a photo detector, associated with detector 140, based on the first control symbols identified by constellation 710. Additionally, tone 720 may represent the first tone that is output by an etalon, associated with detector 140, based on the first control symbols identified by constellation 710.

Filtered response 700 may also include a constellation 725 that identifies second control symbols, associated with the first control sequence, on which the second tone is based. Constellation 725 may identify a first control symbol associated with the fourth phase modulation state (e.g., 3), a second control symbol associated with the third modulation state (e.g., 2), a third control symbol associated with the second phase modulation state (e.g., 1), and a fourth control symbol associated with the first modulation state (e.g., 0). Thus, the second control symbols may include control symbols that correspond to a counter-clockwise direction around constellation 725 (e.g., 3, 2, 1, 0, . . . , 3, 2, 1, 0, . . . ).

Filtered response 700 may include tone 730 and tone 735 that correspond to the second tone that is output by detector 140. Tone 730 may, for example, represent the second tone that is output by the photo detector, associated with detector 140, based on the second control symbols identified by constellation 725. Additionally, tone 735 may represent the second tone that is output by the etalon, associated with detector 140, based on the second control symbols identified by constellation 725.

Tone 715 and tone 730 may include approximately equal power levels and/or identical power responses. Based on the approximately equal power levels and/or identical power responses, the power difference between the first tone and the second tone, outputted by the photo diode, may be approximately zero and thus, indicates that the wavelength of the signal is correctly aligned. Tone 720 and tone 735 may not include approximately equal power levels and/or identical power responses and thus, a power difference between the first tone and the second tone, outputted by the etalon, may be greater than zero. Based on the power difference being greater than zero, OTS 105 may determine whether a wavelocking condition, associated with wavelength or frequency offset, exists within the optical signal.

As shown in FIG. 6, process 600 may include identifying an offset based on a power difference between a first tone and a second tone (block 610). For example, OTS 105 may determine an amount of offset, associated with the optical signal, based on the power difference between the first tone (e.g., based on the first control symbols) and the second tone (e.g., based on the second control symbols). OTS 105 may, for example, retrieve condition information, associated with the first control sequence, that identifies a quantity of offset (e.g., wavelength offset and/or frequency offset) relative to a fixed wavelength and/or frequency (e.g., associated with an etalon within detector 140), as a function of the power difference between the first tone and the second tone. The fixed wavelength and/or frequency may correspond to a center frequency of a channel (e.g., a peak transmission point 525 of FIG. 5A) via which the optical signal is being transmitted.

As shown in FIG. 7B, wavelocking tone strength 750 (hereinafter referred to as "tone strength 750") may identify a wavelength and/or frequency offset as a function of tone strength. Tone strength 750 may include a tone strength scale 755 on a vertical axis and a frequency offset scale 760 (e.g., in gigahertz (GHz)) on a horizontal axis. In another example, tone strength 750 may include a wavelength offset scale, on the horizontal axis, instead of, or in addition to, frequency offset scale 760. Tone strength 750 may include an offset function 765 that identifies a quantity of frequency offset (e.g., as shown on frequency offset scale 760) based on a power difference between the first tone and the second tone (e.g., as shown on tone strength scale 755).

If an amount of offset is not greater than a threshold (block 615—NO), then process 600 may include determining that a channel is wavelocked (block 620). For example, OTS 105 may identify an amount of offset based on the power difference between the first power level associated with the first tone and the second power level associated with the second tone. Based on a determination that the amount of offset is less than a threshold, OTS 105 may determine that a channel is wavelocked and/or that a wavelocking condition, associated with the optical signal, does not exist. OTS 105 may, in one example, determine that the amount of offset is less than the threshold by comparing an absolute value of the power difference to the threshold (e.g., $|\Delta P|<P_T$), where $|\Delta P|$ is the absolute value of the power difference and $P_T$ represents the threshold). Additionally, or alternatively, OTS 105 may determine that the amount of offset is less than the threshold by comparing an absolute value of the offset to the threshold (e.g., $|\Delta f|<f_T$), where $|\Delta f|$ is the absolute value of the offset and $f_T$ represents the threshold). Based on the determination that the wavelocking condition does not exist, OTS 105 may generate and/or output the optical signal without performing an operation to remedy a condition and/or adjust a transmission parameter associated with the optical signal.

If an amount of offset is greater than a threshold (block 615—YES), then process 600 may determine that the channel is not wavelocked (block 625) and adjusting a transmission parameter to cause the channel to become wavelocked (block 630). For example, OTS 105 may determine that the amount of offset is not less than the threshold. Based on the determination that the amount of offset is not less than the threshold, OTS 105 may determine that a wavelocking condition, associated with the optical signal, does exist.

OTS 105 may adjust a transmission parameter, associated with the optical signal, to remedy the wavelocking condition by causing a channel via which the optical signal is being transmitted, to become sufficiently wavelocked. For example, OTS 105 may increase a transmission frequency, associated with the optical signal, when the offset corresponds to a negative frequency offset. In another example, OTS 105 may decrease the transmission frequency when the offset corresponds to a positive frequency offset. OTS 105 may increase or decrease the transmission frequency until the quantity of offset is less than the threshold.

The techniques described above may also, or alternatively, be used to identify offset, associated with an optical signal, when OTS 105 uses an AWG to combined channels shown in MUX 230 in FIG. 2. The offset (e.g., AWG offset), in this example, may be determined relative to one or more reference frequencies associated with the AWG. Additionally, or alternatively, the techniques described above may allow a power condition (e.g., sometimes referred to as "power sense"), associated with the optical signal, to be determined and/or remedied based on one or more power levels, relative to a power threshold, instead of, or in addition to, the difference in power level between the first and second tones. OTS 105 may, for example, determine whether one or more power levels (e.g., associated with the first tone, the second tone, an X-polarized component, a Y-polarized component, etc.) is less than a power threshold and may increase one of the power levels based on the determination that one of the power levels is less than the power threshold.

Figure 8:
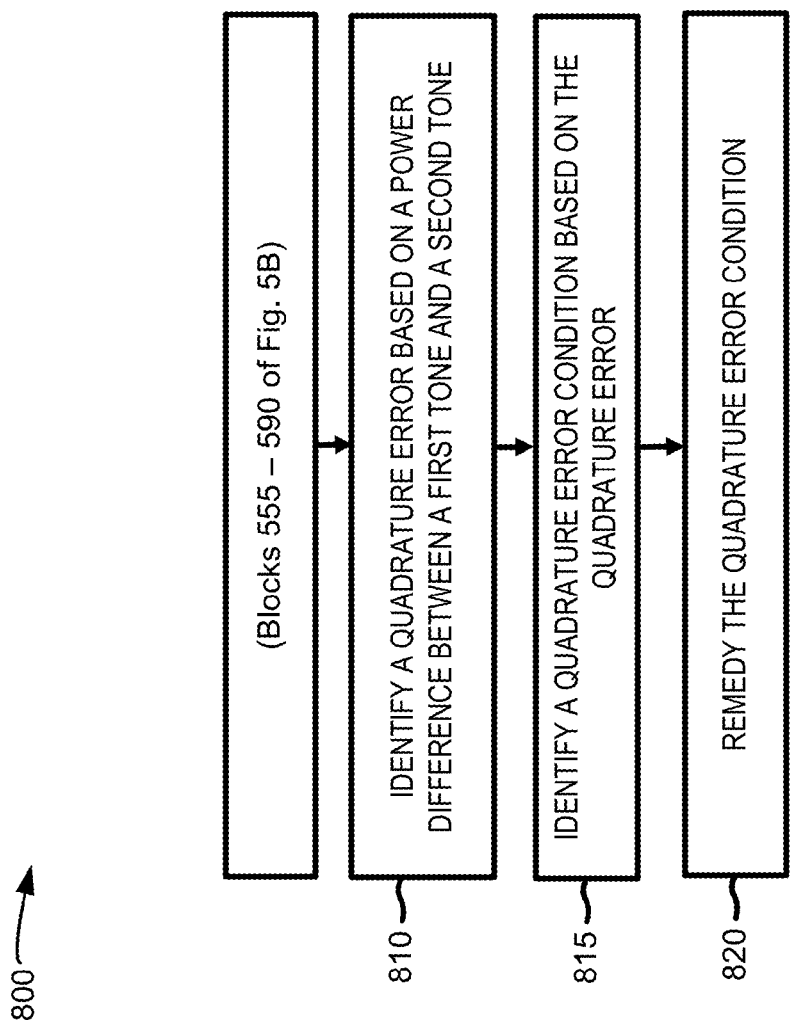
FIG. 8 is a flow chart of an example process for determining quadrature error in an optical signal based on a control sequence.
Figure 9A:
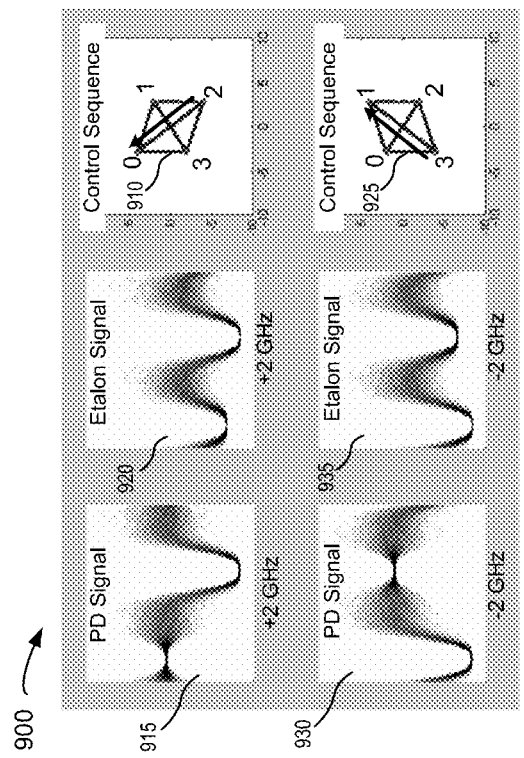
FIGS. 9A and 9B are diagrams of example power responses, based on a control sequence, used to identify a quadrature error condition associated with an optical signal.
Figure 9B:
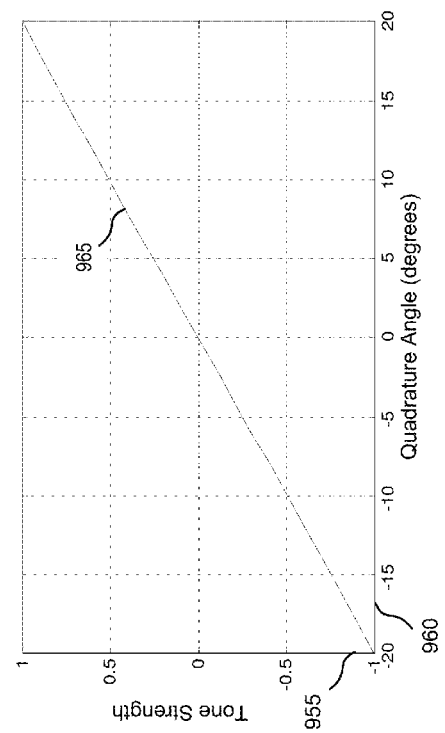

FIG. 8 is a flow chart of an example process 800 for determining quadrature error in an optical signal based on a control sequence. Process 800 may correspond to block 595 of FIG. 5B. In one example implementation, process 800 may be performed by OTS 105. In another example implementation, some or all of process 800 may be performed by a device or collection of devices separate from, or in combination with, OTS 105. FIGS. 9A and 9B are diagrams of filtered response 900 and quadrature tone strength 950, respectively, based on a control sequence, used to identify a quadrature error condition associated with an optical signal. All or a portion of process 800, of FIG. 8, will be described with references to filtered response 900 of FIG. 9A and quadrature tone strength 950 of FIG. 9B.

In a manner similar to that described above with respect to FIG. 6, assume that OTS 105 has generated and outputted an optical signal that includes a second control sequence that has been inserted into client symbols in a manner similar to that described above with respect to blocks 555-575 of FIG. 5B. Assume further that OTS 105 detects a portion of the outputted signal that includes the second control sequence and processes the portion of the optical signal, using the second control sequence to generate a first tone and a second tone in a manner similar to that described above with respect to blocks 580 and 585 of FIG. 5B. In one example, OTS 105 may determine that the second control sequence corresponds to a type of control sequence that can be used to identify and/or control a quadrature error condition associated with the optical signal. Assume still further that OTS 105 identifies a power difference between the first tone and the second tone based on a first power level associated with the first tone and a second power level associated with the second tone in a manner similar to that described above with respect to blocks 590 of FIG. 5B.

For example, as shown in FIG. 9A, filtered response 900 may include a constellation 910 that identifies first control symbols, associated with the second control sequence, on which the first tone is based. Constellation 910 may identify a first control symbol associated with the third phase modulation state (e.g., 2) and a second control symbol associated with the first modulation state (e.g., 0). Thus, as shown in constellation 910, the first control symbols may include one or more patterns associated with the first control symbol associated with the third phase modulation state and the second control symbol associated with the first phase modulation state (e.g., 2, 2, 0, 0, . . . , 2, 2, 0, 0, . . . ).

Filtered response 900 may include tone 915 and tone 920 that correspond to the first tone that is outputted by detector 140. Tone 915 may, for example, represent the first tone that is output by a photo detector, associated with detector 140, based on the first control symbols identified by constellation 910. Additionally, tone 920 may represent the first tone that is output by an etalon, associated with detector 140, based on the first control symbols identified by constellation 910.

Filtered response 900 may also include a constellation 925 that identifies second control symbols, associated with the second control sequence, on which the second tone is based. Constellation 925 may identify a first control symbol associated with the fourth phase modulation state (e.g., 3) and a second control symbol associated with the second phase modulation state (e.g., 1). Thus, as shown in constellation 925, the second control symbols may include one or more patterns associated with the first control symbol associated with the fourth phase modulation state and the second control symbol associated with the second phase modulation state (e.g., 3, 3, 1, 1, . . . , 3, 3, 1, 1, . . . ).

Filtered response 900 may include tone 930 and tone 935 that correspond to the second tone that is outputted by detector 140. Tone 930 may, for example, represent the second tone that is output by the photo detector, associated with detector 140, based on the second control symbols identified by constellation 925. Additionally, tone 935 may represent the second tone that is outputted by the etalon, associated with detector 140, based on the second control symbols identified by constellation 925.

Tone 915 and tone 930 may have different power levels and/or power responses and thus, a power difference, between a first power level associated with tone 915 and a second power level associated with tone 930, may be different than zero. Based on the determination that the power level is different than zero, OTS 105 may determine whether a quadrature error condition is associated with the optical signal. Tone 920 and tone 935 may also have different power levels and/or power responses, thus, the power difference, between a first power level associated with tone 920 and a second power level associated with tone 935, may be different than zero. Based on the determination that the power level is different than zero, OTS 105 may determine whether a quadrature error condition is associated with the optical signal. In this case, OTS 105 may use the power difference obtained via the photo diode and/or the etalon.

As shown in FIG. 8, process 800 may include identifying a quadrature error based on a power difference between a first tone and a second tone (block 810). For example, OTS 105 may determine a quadrature error, associated with the optical signal, based on the power difference between the first tone (e.g., based on the first control symbols) and the second tone (e.g., based on the second control symbols). The quadrature error may, in one example, correspond to a difference between a quadrature angle (e.g., with respect to I and Q components of the signal) and orthogonality (e.g., 90 degrees) for phase modulation based on QPSK techniques. OTS 105 may, for example, retrieve condition information, associated with the second control sequence, that identifies a quadrature error associated with the optical signal as a function of the power difference between the first and second tones.

As shown in FIG. 9B, quadrature tone strength 950 (hereinafter referred to as "tone strength 950") may identify a quadrature error as a function of tone strength. Tone strength 950 may include a tone strength scale 955 on a vertical axis and a quadrature angle scale (e.g., in degrees) on a horizontal axis. Tone strength 950 may include a quadrature function 965 that identifies a quadrature angle (e.g., as shown on quadrature angle scale 960) that represents the quadrature error based on a power difference between the first tone and the second tone (e.g., as shown on tone strength scale 955). Quadrature function 965 may be based on the second control sequence (e.g., the first control symbols identified by constellation 910 of FIG. 9A and the second control symbols identified by constellation 925 of FIG. 9A).

As also shown in FIG. 8, process 800 may also include identifying a quadrature error condition based on the quadrature error (block 815) and remedying the quadrature error condition (block 820). For example, OTS 105 may compare the quadrature angle, identified from tone strength 950 of FIG. 9B, to a threshold to determine whether a quadrature error condition is associated with the optical signal. In one example, OTS 105 may determine that the quadrature angle is less than the threshold based on the comparison. OTS 105 may determine that the quadrature error is less than the threshold by comparing an absolute value of the power difference to the threshold (e.g., $|\Delta P_Q| < P_{TQ}$, where $|\Delta P_Q|$ is the absolute value of the power difference and $P_{TQ}$ represents the threshold). Additionally, or alternatively, OTS 105 may determine that the quadrature error is less than another threshold by comparing an absolute value of the quadrature angle to another threshold (e.g., $|\Delta \phi| < \phi_T$, where $|\Delta \phi|$ is the absolute value of the quadrature angle and $\phi_T$ represents the other threshold). Based on the determination that the quadrature error condition does not exist, OTS 105 may generate and/or output the optical signal without performing an operation to remedy a condition and/or adjust a transmission parameter associated with the optical signal.

In another example, OTS 105 may determine that the quadrature error is not less than the threshold. Based on the determination that the quadrature error is not less than the threshold, OTS 105 may determine that a quadrature error condition is associated with the optical signal.

OTS 105 may adjust a transmission parameter, associated with the optical signal, to remedy the quadrature error condition. For example, OTS 105 may decrease the quadrature angle, when the quadrature error is positive, until the quadrature error is less than the threshold and may increase the quadrature angle, when the quadrature error is negative, until the quadrature error is less than the threshold. Remedying the quadrature error condition may cause constellations 910 and/or 925 of FIG. 9A, to return to a square shape that corresponds to orthogonal phase modulation states (e.g., for QPSK that are separated by approximately 90 degrees).

Figure 10:
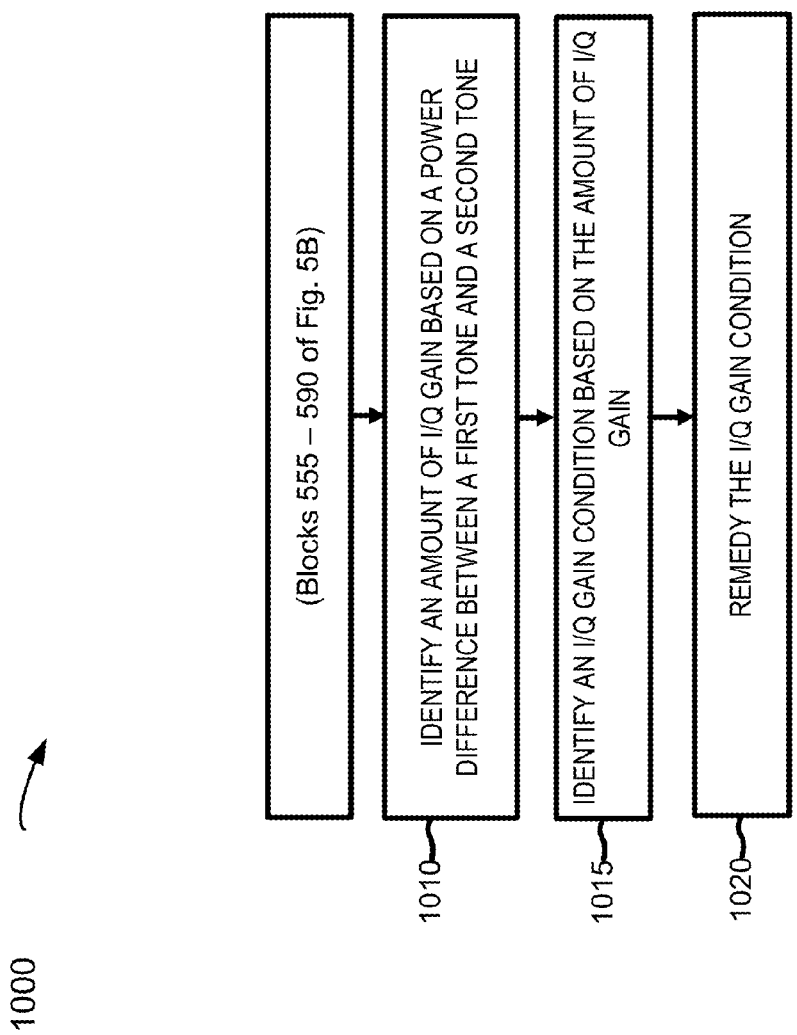
FIG. 10 is a flow chart of an example process for determining a component gain imbalance associated with an optical signal based on a control sequence.
Figure 11A:
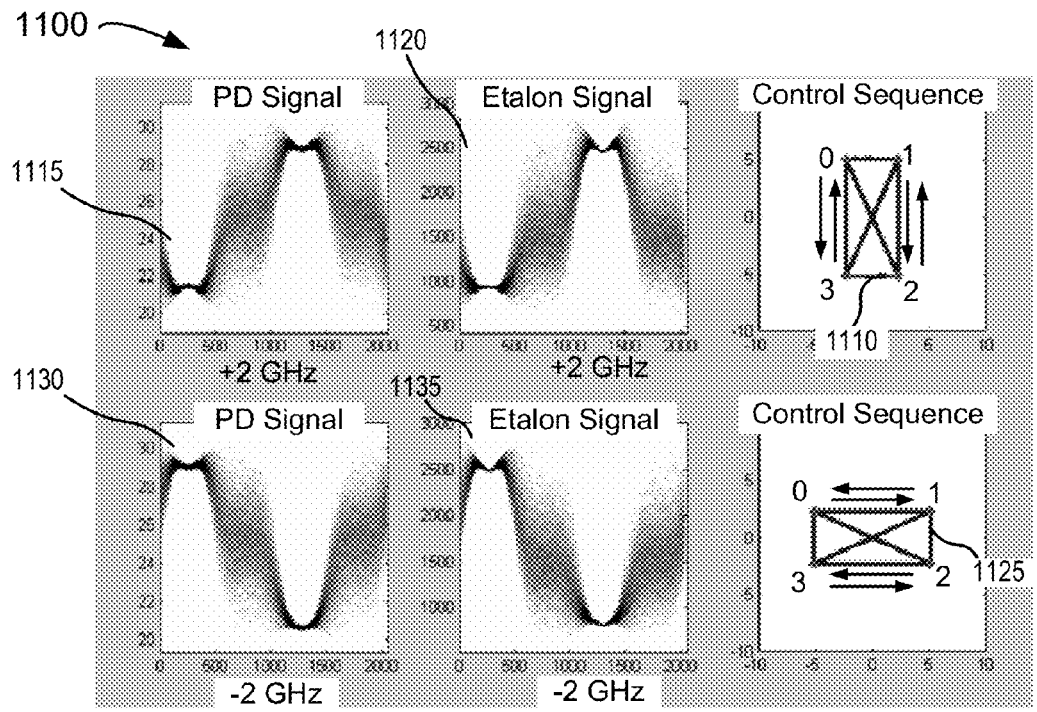
FIGS. 11A and 11B are diagrams of example power responses, based on a control sequence, used to identify an imaginary and real component imbalance condition associated with an optical signal.
Figure 11B:
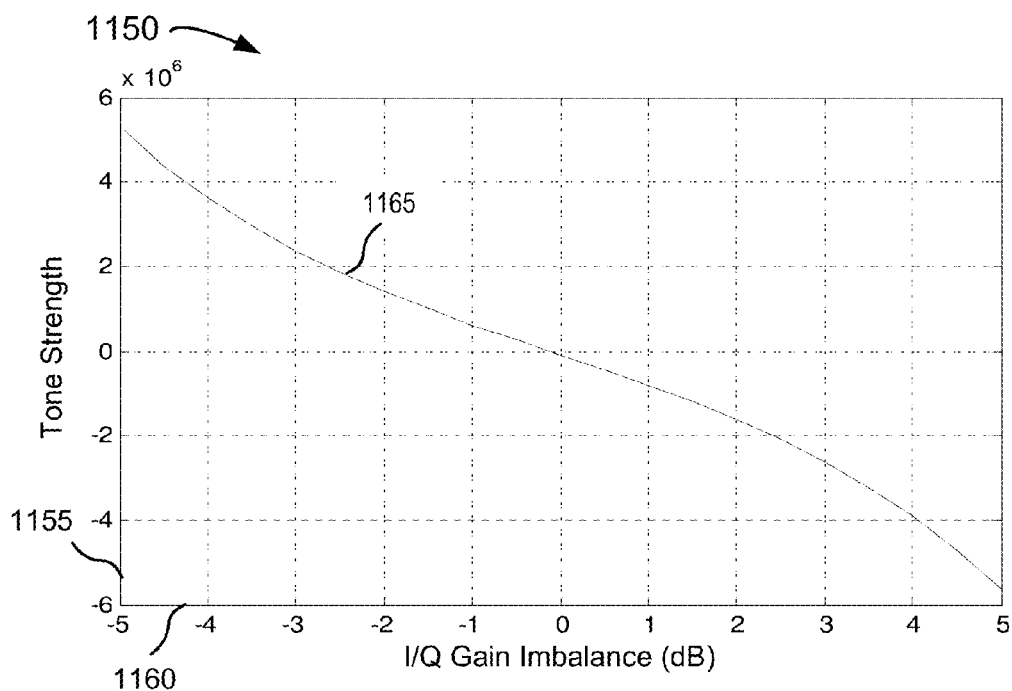

FIG. 10 is a flow chart of an example process 1000 for determining component gain in an optical signal based on a control sequence. Process 1000 may correspond to block 595 of FIG. 5B. In one example implementation, process 1000 may be performed by OTS 105. In another example implementation, some or all of process 1000 may be performed by a device or collection of devices separate from, or in combination with, OTS 105. FIGS. 11A and 11B are diagrams of filtered response 1100 and component gain tone strength 1150, respectively, based on a control sequence, used to identify an I/Q gain condition associated with an optical signal. All or a portion of process 1000, of FIG. 10, will be described with references to filtered response 1100 of FIG. 11A and component gain tone strength 1150 of FIG. 11B.

In a manner similar to that described above with respect to FIG. 6, assume that OTS 105 has generated and outputted an optical signal that includes a third control sequence that has been inserted into client symbols in a manner similar to that described above with respect to blocks 555-575 of FIG. 5B. Assume further that OTS 105 detects a portion of the outputted signal that includes the third control sequence and processes the portion of the optical signal, using the third control sequence to generate a first tone and a second tone in a manner similar to that described above with respect to blocks 580 and 585 of FIG. 5B. In one example, OTS 105 may determine that the third control sequence may correspond to a type of control sequence that can be used to identify and/or control an I/Q gain condition associated with the optical signal. Assume still further that OTS 105 identifies a power difference between the first tone and the second tone based on a first power level associated with the first tone and a second power level associated with the second tone in a manner similar to that described above with respect to blocks 590 of FIG. 5B.

For example, as shown in FIG. 11A, filtered response 1100 may include a constellation 1110 that identifies first control symbols, associated with the third control sequence, on which the first tone is based. Constellation 1110 may identify a two pair of control symbols, such as a first pair of control symbols that includes a first control symbol associated with the fourth phase modulation state (e.g., 3) and a second control symbol associated with the first modulation state (e.g., 0). Constellation 1110 may also, or alternatively, identify a second pair of control symbols, such as a third control symbol associated with the second phase modulation state (e.g., 1) and a fourth control symbol associated with the third phase modulation state (e.g., 2). Thus, as shown in constellation 1110, the first control symbols may include one or more patterns of control symbols based on the first pair of control symbols and the second pair of control symbols (e.g., 3, 0, 3, 0, . . . , 1, 2, 1, 2, . . . ).

Filtered response 1100 may include tone 1115 and tone 1120 that correspond to the first tone that is output by detector 140. Tone 1115 may, for example, represent the first tone that is output by a photo detector, associated with detector 140, based on the first control symbols identified by constellation 1110. Additionally, tone 1120 may represent the first tone that is output by an etalon, associated with detector 140, based on the first control symbols identified by constellation 1110.

Filtered response 1100 may also include a constellation 1125 that identifies second control symbols, associated with the third control sequence, on which the second tone is based. Constellation 1125 may identify two pair of control symbol, such as first control symbols associated with the second phase modulation state (e.g., 1) and a second control symbol associated with the first phase modulation state (e.g., 0). Constellation 1125 may also identify a second pair of control symbols, such as a third control symbol associated with the fourth phase modulation state (e.g., 3) and a fourth control symbol associated with the third phase modulation state (e.g., 2). Thus, as shown in constellation 1125, the first control symbols may include one or more patterns of control symbols based on the first pair of control symbols and the second pair of control symbols (e.g., 1, 0, 1, 0, . . . , 3, 2, 3, 2, . . . ).

Filtered response 1100 may include tone 1130 and tone 1135 that correspond to the second tone that is output by detector 140. Tone 1130 may, for example, represent the second tone that is output by the photo detector, associated with detector 140, based on the second control symbols identified by constellation 1125. Additionally, tone 1135 may represent the second tone that is output by the etalon, associated with detector 140, based on the second control symbols identified by constellation 1125.

Tone 1115 and tone 1130 may have different power levels and/or power responses and thus, a power difference, between a first power level associated with tone 1115 and a second power level associated with tone 1130, may be different than zero. Based on the determination that the power level is different than zero, OTS 105 may determine whether an I/Q gain error condition is associated with the optical signal. Tone 1120 and tone 1135 may also have different power levels and/or power responses, thus, the power difference, between a first power level associated with tone 1120 and a second power level associated with tone 1135, may be different than zero. Based on the determination that the power level is different than zero, OTS 105 may determine whether an I/Q gain error condition is associated with the optical signal. In this case, OTS 105 may use the power difference obtained via the photo diode and/or the etalon.

As shown in FIG. 10, process 1000 may include identifying an amount of I/O gain based on a power difference between a first tone and a second tone (block 1010). For example, OTS 105 may determine a difference in an amount of power associated with an I component of the optical signal and an amount of power associated with the Q component of the optical signal (e.g., I/O gain), based on the power difference between the first tone and the second tone. OTS 105 may, for example, retrieve condition information, associated with the third control sequence, that identifies I/Q gain, associated with the optical signal, as a function of the power difference between the first and second tones.

As shown in FIG. 11B, component tone strength 1150 (hereinafter referred to as "tone strength 1150") may identify an amount of I/Q gain as a function of tone strength. Tone strength 1150 may include a tone strength scale 1155 on a vertical axis and an I/Q gain imbalance (e.g., in dB) on a horizontal axis. Tone strength 1150 may include an I/Q gain function 1165 that identifies an amount of gain (e.g., as shown on I/Q gain scale 1160) that represents the I/Q gain error based on a power difference between the first tone and the second tone (e.g., as shown on tone strength scale 1155). I/Q gain function 1165 may be based on the pairs of control symbols identified by constellation 1110 of FIG. 11A and other pairs of control symbols identified by constellation 1125 of FIG. 11A).

As also shown in FIG. 10, process 1000 may also include identifying an I/Q gain condition based on the amount of I/Q gain (block 1015) and remedying the I/Q gain condition (block 1020). For example, OTS 105 may compare the amount of I/Q gain, identified from tone strength 1150 of FIG. 11B, to a threshold to determine whether an I/Q gain condition is associated with the optical signal. In one example, OTS 105 may determine that the amount of I/Q gain is less than the threshold based on the comparison. OTS 105 may determine that the amount of I/Q gain is less than the threshold by comparing an absolute value of the power difference to the threshold (e.g., $|\Delta P_G| < P_{TG}$, where $|\Delta P_G|$ is the absolute value of the power difference and $P_{TG}$ represents the threshold). Additionally, or alternatively, OTS 105 may determine that the amount of I/Q gain is less than another threshold by comparing an absolute value of the I/Q gain to another threshold (e.g., $|\Delta G| < G_T$, where $|\Delta G|$ is the absolute value of the I/Q gain and $G_T$ represents the other threshold). Based on the determination that the I/Q gain condition does not exist, OTS 105 may generate and/or output the optical signal without performing an operation to remedy a condition and/or adjust a transmission parameter associated with the optical signal.

In another example, OTS 105 may determine that the amount of I/Q gain is not less than the threshold. Based on the determination that the amount of I/Q gain is not less than the threshold, OTS 105 may determine that an I/Q gain condition is associated with the optical signal. OTS 105 may adjust a transmission parameter, associated with the optical signal, to remedy the I/Q gain condition. For example, OTS 105 may decrease an amount of power in the I component and/or Q component, of the optical signal, when the I/Q gain is positive, until the I/Q gain is less than the threshold and may increase an amount of power in the I component and/or Q component when the I/Q gain is negative until the I/Q gain is less than the threshold. Remedying the quadrature error condition may cause constellations 1110 and/or 1125 of FIG. 11A, to return to a square shape (e.g., from a rectangular shape), which may indicate that the amount of power in the I component and the Q component are approximately equal.

A system and/or method, described herein, may permit an optical transmitter system to generate an optical signal that includes one or more control sequences that permit control parameters, within the optical signal, to be identified. The system and/or method may allow the transmitter system to determine conditions, associated with the optical signal, based on the identified control parameters. The system and/or method may enable the transmitter system to adjust one or more of the control parameters, associated with the optical system, to remedy the condition.

The foregoing description provides illustration and description, but is not intended to be exhaustive or to limit the implementations to the precise form disclosed. Modifications and variations are possible in light of the above disclosure or may be acquired from practice of the implementations.

For example, while series of blocks have been described with regard to FIGS. 5B, 6, 8, and 10, the order of the blocks may be changed in other implementations. Also, non-dependent blocks may be performed in parallel.

The control sequences, described herein, are provided for explanatory purposes only. In other implementations, additional control sequences, fewer control sequences, different control sequences, or differently arranged control sequences may be used to generate and/or process the optical signal. Additionally, or alternatively, one or more of the techniques and/or operations, described herein, may be performed sequentially or in parallel (e.g., when the two or more techniques and/or operations are being performed during a time period). Additionally, or alternatively, the techniques and/or operations may be performed on a one-time basis, after an interval of time (e.g., every 30 seconds, one minute, one hour, etc.), or continuously. For example, all or a portion of the techniques may be performed continuously while an optical signal is being processed and/or transmitted and may stop being performed when the optical signal is no longer being processed and/or transmitted.

Furthermore, while the disclosed embodiments have been presented as generally suitable for use in an optical network, the systems and methods disclosed herein are suitable for any fiber optic network, fiber network, fiber line, or link that includes one or more transmission spans, amplifier spans, or hops.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, with a node, a phase-modulated signal that carries client symbols and a control sequence, the node having a memory associated therewith, where the control sequence includes:
        first control symbols on which a first tone is to be based, the first tone having a first power level, and
        second control symbols on which a second tone is to be based, the second tone having a second power level;
    processing a first portion of the signal to generate the first tone and a second portion of the signal to generate the second tone, where the first portion includes the first control symbols and where the second portion includes the second control symbols;
    determining a power difference based on a difference between the first power level and the second power level;
    retrieving, from the memory, condition information, associated with the control sequence, that identifies a threshold for determining whether a condition, that corresponds to a particular type of condition, is associated with the signal based on the power difference;
    determining whether the power difference is greater than the threshold;
    determining that the condition is associated with the signal when the power difference is greater than the threshold; and
    outputting an instruction to adjust a parameter, used to transmit the signal, based on the determination that the condition is associated with the signal, where the instruction to adjust the parameter causes the power difference to decrease to a level that is less than the threshold.

2. The method of claim 1, where the first control symbols include:
    a first set of control symbols in one or more first predetermined phase modulation states, and
    a second set of control symbols in one or more second predetermined phase modulation states; and
where the second control symbols include:
    a third set of control symbols in one or more third predetermined phase modulation states, and
    a fourth set of control symbols in one or more fourth predetermined phase modulation states.

3. The method of claim 1, where processing the first portion of the signal and the second portion of the signal further includes:
    outputting a first version of the first tone using a first filter, associated with a photo detector;
    outputting a second version of the first tone using a second filter associated with an etalon device;
    outputting a first version of the second tone using the first filter associated with the photo detector; and
    outputting a second version of the second tone using the second filter associated with the etalon device.

4. The method of claim 3, where determining the power difference includes:
    measuring a first power difference based on a power level associated with the first version of the first tone and a power level associated with the first version of the second tone; and
    measuring a second power difference based on a power level associated with the second version of the first tone and a power level associated with the second version of the second tone.

5. The method of claim 1, further comprising:
    determining, based on the condition information, that the particular type of condition corresponds to an amount of wavelength offset relative to a reference wavelength; and
    outputting an instruction to adjust a particular parameter, associated with a wavelength at which the signal is being transmitted, when the power difference is greater than the threshold and based on the determination that the particular type of condition corresponds to the amount of wavelength offset; or outputting an instruction to continue to transmit the signal, without adjusting the particular parameter, when the power difference is not greater than the threshold.

6. The method of claim 1, further comprising:

determining, based on the condition information, that the particular type of condition corresponds to an amount of quadrature angle error relative to a reference quadrature angle; and outputting an instruction to adjust a parameter, associated with a quadrature angle at which the signal is being transmitted, when the power difference is greater than the threshold and based on the determination that the particular type of condition corresponds to the amount of quadrature angle error; or outputting an instruction to continue to transmit the signal, without adjusting the particular parameter, when the power level is not greater than the threshold.

7. The method of claim 1, further comprising:

determining, based on the condition information, that the particular type of condition corresponds to a difference in power, between an in-phase component of the signal and a quadrature component of the signal, relative to a reference difference in power; and outputting an instruction to adjust a particular parameter, associated with a first power level of the in-phase component or a second power level of the quadrature component, when the power difference is greater than the threshold and based on the determination that the particular type of condition corresponds to the difference in power between the in-phase component and the quadrature component; or outputting an instruction to continue to generate the signal without adjusting the particular parameter, when the power difference is less than the threshold.

8. The method of claim 1, where the condition information identifies at least one of:

a first control sequence for identifying a first condition when the power difference is greater than the threshold, where the first condition corresponds to a quantity of wavelength offset, of the signal, that is greater than a first threshold, a second control sequence for identifying a second condition when the power difference is greater than the threshold, where the second condition corresponds to a quantity quadrature angle error, of the signal, that is greater than an second threshold, a third control sequence for identifying a third condition when the power difference is greater than the threshold, where the third condition corresponds to a difference, between a first power level of an in-phase component of the signal and a second power level of a quadrature component, of the signal, that is greater than a third threshold.

9. The method of claim 1, further comprising:

receiving a client signal;

obtaining a plurality of control sequences in response to receiving the client signal;

generating the signal based on the client signal and one or more control sequences, of the plurality of control sequences, where generating the signal causes the optical transmission system to insert, in to the signal, at least one of:

a first control sequence, of the one or more control sequences, for identifying a condition regarding a wavelength offset associated with the signal, a second control sequence, of the one or more control sequences, for identifying a condition regarding a quadrature angle error associated with the signal, a third control sequence, of the one or more control sequences, for identifying a condition associated with a power imbalance between an in-phase component and a quadrature component of the signal, a fourth control sequence, of the one or more control sequences, for identifying a condition regarding a power-level associated with the signal or one or more components of the signal, or a fifth control sequence, of the one or more control sequences, for identifying a condition regarding a time delay between the in-phase component and the quadrature component of the signal.

10. The method of claim 1, where the condition information includes information that identifies one of one or more control sequences that correspond to one of one or more conditions, and where the condition information, for a particular control sequence, of the one or more control sequences includes at least one of:

control symbols associated with the particular control sequence, information identifying a particular condition of the one or more conditions, information associated with a function that identifies a relationship between a parameter, associated with a particular signal, and a power difference associated with the particular signal, where the parameter corresponds to one of:
  a wavelength or frequency,
  a quadrature angle,
  a power level, or
  a phase angle, or a threshold corresponding to the parameter, associated with the particular signal, or the power difference, associated with the particular signal, for determining whether the particular condition exists.

11. An optical transmission system, comprising: one or more devices to:

detect a phase-modulated signal that includes client symbols and a control sequence, where the control sequence includes: first control symbols that are based on first predetermined phase modulation states, and second control symbols that are based on second predetermined phase modulation states, generate a first tone, having a first power level, in response to the first control symbols, generate a second tone, having a second power level, in response to second control symbols, identify a power difference between the first tone and the second tone based on the first power level and the second power level, determine whether the power difference is greater than a threshold, output the signal, without adjusting a parameter when the power difference is not greater than the threshold, where the parameter controls a manner in which the signal is generated or transmitted, adjust the parameter to cause the power difference to decrease to a level that is not greater than the threshold when the power difference is greater than the threshold, and output the signal based on the adjusted parameter.

12. The optical transmission system of claim 11, where the parameter corresponds to at least one of:

a wavelength or frequency of the signal,
a power level of the signal, a power level of an in-phase component of the signal or a quadrature component of the signal, a quadrature angle between the in-phase component and the quadrature component, or phase associated with the signal.

13. The optical transmission system of claim 11, where, when adjusting the parameter, the one or more devices are further to:

adjust a first parameter that controls a wavelength or frequency of the signal when the control sequence corresponds to a first condition associated with wavelength offset, adjust a second parameter that controls a power level of an in-phase component of the signal or a quadrature component of the signal, when the control sequence corresponds to a second condition associated with a difference in power between the in-phase component and the quadrature component, adjust a third parameter that controls the a quadrature angle of the signal when the control sequence corresponds to a third condition associated with a quadrature angle offset, or adjust a fourth parameter that controls a phase angle of the signal when the control sequence corresponds to a fourth condition associated with a difference in time of arrive between the in-phase component and quadrature component.

14. The optical transmission system of claim 11, further comprising:

a transmitter to:
receive a client signal,
obtain the first predetermined phase modulation states and the second predetermined phase modulation states,
generate the first control symbols based on the first predetermined phase modulation states,
generate the second control symbols based on the second predetermined phase modulation states,
generate the client symbols based on the client signal, and
output the signal based on the first control symbols, the second control symbols, and the client symbols.

15. The optical transmission system of claim 11, where, when generating the first tone, the one or more devices are further to:

generate a first version of the first tone using a photo detector associated with the optical transmission system,
generate a first version of the second tone using the photo detector,
identify a first power difference based on a power level associated with the first version of the first tone and the first version of the second tone.

16. The optical transmission system of claim 15, where the one or more devices are further to:

generate a second version of the first tone using an etalon device associated with the optical transmission system,
generate a second version of the second tone using the etalon device,
identify a second power difference based on a power level associated with the second version of the first tone and the second version of the second tone,
identify whether the control sequence corresponds to a first type of condition, a second type of condition, or a third type of condition, determine, using the first power difference, whether the first type of condition is associated with the signal when the control sequence corresponds to the first type of condition, determine, using the second power difference, whether the second type of condition is associated with the signal when the control sequence corresponds to the second type of condition, and determine, using the first power difference or the second power difference, whether the third type of condition is associated with the signal when the control sequence corresponds to the third type of condition.

17. The optical transmission system of claim 16, where the first type of condition is associated with a wavelength offset of the signal, relative to an array waveguide grating (AWG) device associated with the optical transmission system, where the second type of condition is associated with a wavelength offset of the signal, relative to the etalon device associated with the optical transmission system, and where the third type of condition is associated with a quadrature error associated with the signal, a difference in power level between an in-phase component and quadrature component associated with the signal, or a power level associated with the signal.

18. The optical transmission system of claim 11, where a type of phase modulation, associated with the signal, corresponds to one of:

quadrature phase shift keying (QPSK),
binary phase shift keying (BPSK),
on-off keying (OOK), or
quadrature amplitude modulation (QAM).

19. The optical transmission system of claim 11, further comprising:

a device, located at a geographical location that is different from a location associated with the one or more devices, where the device is to:
monitor the signal to identify at least one condition, associated with the signal, where the at least one condition includes:
chromatic dispersion,
polarization mode dispersion,
polarization dependent loss,
wavelength dependent loss,
optical noise accumulation,
cross-phase modulation, or
self-phase modulation, and
output, to the one or more devices, an instruction that indicates that the at least one condition exists, where the instruction enables the one or more devices to:
determine whether the condition can be remedied, and
adjust the parameter to cause the condition to no longer exist, when the condition can be remedied.

20. A network device comprising:

a memory to store condition information that identifies a plurality of control sequences and a plurality of conditions to which the plurality of control sequences correspond, where each of the plurality of control sequences correspond to a respective one of the plurality of conditions;

one or more detector components to:
detect a phase-modulated signal that includes client symbols and a control sequence, of the plurality of control sequences, the control sequence allowing a condition of the plurality of conditions, associated with the signal, to be identified, generate a first tone, having a first power level, in response to first control symbols obtained from the control sequence, and generate a second tone, having a second power level, in response to second control symbols obtained from the control sequence; and one or more processors to:

determine whether a power difference, between the first power level and the second power level, is greater than a threshold identified by the condition information associated with the control sequence, output the signal, without adjusting a parameter associated with the signal, when the power difference is not greater than the threshold, and output the signal, in a manner that includes adjusting the parameter, when the power difference is greater than the threshold, where adjusting the parameter causes the power difference to decrease to a level that is less than the threshold.

21. The network device of claim 20, where the one more detectors include:

a first detector to:

generate a first version of the first tone and a first version of the second tone, and output the first version of the first tone and the first version of the second tone;

and a second detector to:

generate a second version of the first tone and a second version of the second tone, and output the second version of the first tone and the second version of the second tone.

22. The network device of claim 21, where the one or more processors are further to:

identify a first power difference between a third power level associated with the first version of the first tone and a fourth power level associated with the first version of the second tone, identify a second power difference between a third power level associated with the second version of the first tone and a fourth power level associated with the second version of the second tone.

23. The network device of claim 22, where the one or more processors are to:

determine that the condition information, associated with the control sequence, includes a first threshold for identifying a condition, corresponding to wavelength offset, associated with the signal, identify an amount of offset of a wavelength of the signal relative to the reference wavelength based on the second power difference, determine that the amount of offset is greater than the first threshold, and output an instruction to adjust the wavelength of the signal to cause the amount of offset of the wavelength to decrease to an amount that is not greater than the first threshold.

24. The network device of claim 22, where the one or more processors are to:

determine that the condition information, associated with the control sequence, includes a first threshold for identifying a condition, corresponding to quadrature error, associated with the signal, identify an amount of error of a quadrature angle of the signal relative to a reference quadrature angle based on the first power difference or the second power difference, determine that the amount of error is greater than the first threshold, and output an instruction to adjust the quadrature angle of the signal to cause the amount of error of the quadrature angle to decrease to an amount that is not greater than the first threshold.

25. The network device of claim 22, where the one or more processors are to:

determine that the condition information, associated with the control sequence, includes a first threshold for identifying a condition, associated with a power-level imbalance between an in-phase component and a quadrature component of the signal, identify a difference of power between the quadrature component and the in-phase component based on the first power difference or the second power difference, determine that the difference of power is greater than the first threshold, and output an instruction to adjust an amount of power in the in-phase component or the quadrature component of the signal to cause the difference of power to decrease to an amount that is not greater than the first threshold.

26. The network device of claim 20, where the one or more processors are further to:

generate a first power level associated with the first tone, where the first power level is based on:

a portion of the first tone associated with a highest power level relative to a power level of any other portion of the first tone, where the highest power level corresponds to a contiguous group of control symbols, within the first set of control symbols, that includes consecutive control symbols associated with a same phase modulation state, and another portion of the first tone associated with a lowest power level relative to a power level of any other portion of the first tone, where the lowest power level corresponds to a different contiguous group of control symbols, within the first set of control symbols, that does not include any consecutive control symbols associated with a same phase modulation state.

* * * * *